US010986630B2

(12) United States Patent
Sun et al.

(10) Patent No.: US 10,986,630 B2
(45) Date of Patent: Apr. 20, 2021

(54) METHOD FOR SCHEDULING TRANSMISSION IN WIRELESS COMMUNICATIONS SYSTEM, AND DEVICE

(71) Applicant: Huawei Technologies Co., Ltd., Guangdong (CN)

(72) Inventors: Wei Sun, Shenzhen (CN); Zhiheng Guo, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 16/366,105

(22) Filed: Mar. 27, 2019

(65) Prior Publication Data

US 2019/0223181 A1 Jul. 18, 2019

Related U.S. Application Data

(63) Continuation of application No. PCT/CN2017/102118, filed on Sep. 18, 2017.

(30) Foreign Application Priority Data

Sep. 28, 2016 (CN) ........................ 201610867136.1

(51) Int. Cl.
*H04W 72/04* (2009.01)
*H04W 72/12* (2009.01)
(Continued)

(52) U.S. Cl.
CPC ..... *H04W 72/0446* (2013.01); *H04W 52/146* (2013.01); *H04W 52/325* (2013.01);
(Continued)

(58) Field of Classification Search
CPC ................................................ H04W 72/0446
See application file for complete search history.

(56) References Cited

U.S. PATENT DOCUMENTS

2013/0343336 A1* 12/2013 Bai ...................... H04L 1/0086 370/329
2015/0105119 A1* 4/2015 Eriksson ............ H04W 52/146 455/522

(Continued)

FOREIGN PATENT DOCUMENTS

CN 102655676 A 9/2012
CN 104938008 A 9/2015

(Continued)

*Primary Examiner* — Edan Orgad
*Assistant Examiner* — Abdeltif Ajid
(74) *Attorney, Agent, or Firm* — Slater Matsil, LLP

(57) ABSTRACT

A method for scheduling transmission in a wireless communications system, and a device are disclosed, to resolve a technical problem that uplink transmission in a cell in which the uplink transmission is performed may be interfered with by downlink transmission. The method includes: determining, by a network device, a priority of each transmission time interval used for first-direction transmission in a transmission time interval set, where the first-direction transmission is along a downlink direction from the network device to user equipment or along an uplink direction from the user equipment to the network device; selecting, by the network device, for a first cell, at least one transmission time interval from the transmission time interval set based on the priority; and performing, by the network device, in the first cell, the first-direction transmission with the user equipment by using the selected at least one transmission time interval.

18 Claims, 6 Drawing Sheets

User equipment

Base station

S121: Determine a priority of each transmission time interval used for uplink-direction transmission in a transmission time interval set S122: Select, for a first cell, at least one transmission time interval from the transmission time interval set based on the priority S123: Determine whether a transmission period of the first cell includes a contradirectional interference transmission time interval S124: indication information S125: Perform, in the first cell, uplink transmission by using the at least one transmission time interval

(51) Int. Cl.
*H04W 52/14* (2009.01)
*H04W 72/10* (2009.01)
*H04W 52/32* (2009.01)
*H04W 72/08* (2009.01)

(52) U.S. Cl.
CPC ......... *H04W 72/082* (2013.01); *H04W 72/10* (2013.01); *H04W 72/12* (2013.01)

(56) References Cited

U.S. PATENT DOCUMENTS

2015/0256320 A1 9/2015 Feng et al.
2015/0365941 A1 12/2015 Kazmi
2016/0113007 A1 4/2016 Centonza et al.
2016/0197687 A1* 7/2016 Song ................ H04W 72/0446 370/252

FOREIGN PATENT DOCUMENTS

CN 105432033 A 3/2016
WO 2011077288 A2 6/2011
WO 2015042881 A1 4/2015

* cited by examiner

| | | | | | | | | | |
|---|---|---|---|---|---|---|---|---|---|
| | | 1 | 3 | | | | 2 | 4 | |

| | | | | | | | | | |
|---|---|---|---|---|---|---|---|---|---|
| 10 | 9 | 1 | 3 | 6 | 7 | 8 | 2 | 4 | 5 |

| | | | | | | | | | |
|---|---|---|---|---|---|---|---|---|---|
| 1 | 3 | | | | 2 | 4 | | | |

| | | | | | | | | | |
|---|---|---|---|---|---|---|---|---|---|
| 1 | 2 | 5 | 6 | 7 | 3 | 4 | 8 | 9 | 10 |

METHOD FOR SCHEDULING TRANSMISSION IN WIRELESS COMMUNICATIONS SYSTEM, AND DEVICE

CROSS-REFERENCE TO RELATED DISCLOSURES

This application is a continuation of International Application No. PCT/CN2017/102118, filed on Sep. 18, 2017, which claims priority to Chinese Patent Application No. 201610867136.1, filed on Sep. 28, 2016. The disclosures of the aforementioned applications are hereby incorporated by reference in their entireties.

TECHNICAL FIELD

The present disclosure relates to the field of communications technologies, and in particular, to a method for scheduling transmission in a wireless communications system, and a device.

BACKGROUND

Duplex modes of a Long Term Evolution (LTE)/Long Term Evolution Advanced (LTE-A) communications system may be mainly categorized into a frequency division duplex (FDD) mode and a time division duplex (TDD) mode. For a wireless communications system working in the TDD mode, during a period of time, an entire frequency band may be used only for downlink transmission, or may be used only for uplink transmission, and for an area covered by a same frequency band, all cells in the area are synchronous, to be specific, transmission in all the cells at a same moment needs to be downlink transmission or uplink transmission. For a wireless system working in the FDD mode, spectrums are used in pairs, to be specific, one uplink frequency band is used to transmit an uplink service and uplink signaling, one downlink frequency band is used to transmit a downlink service and downlink signaling, the uplink frequency band can be used only for uplink transmission, and the downlink frequency band can be used only for downlink transmission.

Considering that user equipments in a system are unevenly distributed, communications services for different user equipments are quite different, and at a same moment, a downlink service quantity and an uplink service quantity are quite different for a cell covered by a same frequency band, and service requirements for different cells cannot be satisfied if a same uplink and downlink transmission configuration is used for all the cells. For a same cell, a downlink service quantity and an uplink service quantity vary greatly at different time. Therefore, to increase utilization of a transmission resource in the system, a flexible duplex technology may be used, to separately configure a transmission direction of each cell. For example, an uplink-downlink transmission configuration in a current cell may be determined based on a ratio of an uplink service to a downlink service in the cell.

In this case, within a same transmission time interval (TTI), due to flexible duplex, when uplink transmission is performed in a cell, downlink transmission may be performed in a neighboring cell. In this case, because a signal transmit end of the downlink transmission is a base station and transmit power is relatively large, the downlink transmission causes relatively large interference to the uplink transmission in the cell in which the uplink transmission is performed. However, there is no solution to this currently.

SUMMARY

Embodiments of the present disclosure provide a method for scheduling transmission in a wireless communications system, and a device, to resolve a technical problem that uplink transmission in a cell in which the uplink transmission is performed may be interfered with by downlink transmission.

According to a first aspect, a method for scheduling transmission in a wireless communications system is provided, and the method may be implemented by using a network device. The method includes: determining, by a network device, a priority of each transmission time interval used for first-direction transmission in a transmission time interval set, where the first-direction transmission is along a downlink direction from the network device to user equipment or along an uplink direction from the user equipment to the network device; selecting, by the network device, for a first cell, at least one transmission time interval from the transmission time interval set based on the priority; and performing, by the network device, in the first cell, the first-direction transmission with the user equipment by using the selected at least one transmission time interval.

In the embodiments of the present disclosure, the transmission time interval set may be preset, and when scheduling the transmission time interval, the network device may schedule, for the user equipment, the transmission time interval from the transmission time interval set. If a plurality of network devices all preferentially schedule, for the user equipment, transmission time intervals from the transmission time interval set, different network devices have almost a same selection when selecting the transmission time intervals. Therefore, moments at which the different network devices perform uplink transmission may be the same, so that a possibility that the uplink transmission is interfered with by downlink transmission in another cell is reduced as far as possible, and transmission quality is improved.

With reference to the first aspect, in a first possible implementation of the first aspect, the selecting, by the network device, at least one transmission time interval from the transmission time interval set based on the priority may be implemented in the following manners: selecting, by the network device, the at least one transmission time interval from the transmission time interval set in descending order of the priorities, or selecting, by the network device, the at least one transmission time interval from the transmission time interval set in ascending order of the priority.

In the embodiments of the present disclosure, network devices on an entire network or in a cell group may all use a same transmission time interval set, and all schedule a transmission time interval from the transmission time interval set by using a same scheduling rule, so that uplink and downlink transmission time intervals on the entire network or in the cell group may be the same as far as possible, and contradirectional interference cases on the entire network or in the cell group can be reduced to a great extent. The at least one transmission time interval may be selected in descending order of priorities or in ascending order of priorities, provided that the network devices on the entire network or in the cell group all use the same scheduling rule. This is not limited in the embodiments of the present disclosure.

With reference to the first aspect or the first possible implementation of the first aspect, in a second possible implementation of the first aspect, the network device may further determine whether a transmission period of the first cell includes a contradirectional interference transmission time interval. The network device sends indication information to the user equipment based on a result of determining whether the contradirectional interference transmission time interval is included, where the indication information is used to indicate a power control parameter used by the user equipment to perform uplink transmission. The contradirectional interference transmission time interval is a transmission time interval that is configured for uplink transmission in the first cell and configured for downlink transmission in a second cell.

Uplink service load of each cell is different. Even if a same transmission time interval set and a same scheduling rule are used, an uplink-downlink configuration of each cell may be different. The transmission time interval set and the scheduling rule can reduce contradirectional interference as far as possible. However, because the uplink service load is different and each cell has a different quantity of uplink transmission time intervals, the contradirectional interference may still exist. Therefore, in the embodiments of the present disclosure, a plurality of sets of power control parameters may be configured by a base station, and the user equipment may calculate uplink transmit power by using the power control parameters. For two cases in which the first cell includes the contradirectional interference transmission time interval and does not include the contradirectional interference transmission time interval, the user equipment may select different power control parameters, to obtain different uplink transmit power by using the power control parameters. When the first cell does not include the contradirectional interference transmission time interval, the calculated uplink transmit power may be relatively small, to save energy. When the first cell includes the contradirectional interference transmission time interval, the calculated uplink transmit power may be relatively large, so that impact brought by the contradirectional interference can be reduced as far as possible.

With reference to the second possible implementation of the first aspect, in a third possible implementation of the first aspect, the determining, by the network device, whether a transmission period of the first cell includes a contradirectional interference transmission time interval includes, but is not limited to, the following several manners: obtaining, by the network device, transmission time interval scheduling information of the second cell, and determining, based on the transmission time interval scheduling information, whether the transmission period of the first cell includes the contradirectional interference transmission time interval; or receiving, by the network device, transmission time interval scheduling information of the second cell that is sent by another network device corresponding to the second cell, and determining, based on the transmission time interval scheduling information, whether the transmission period of the first cell includes the contradirectional interference transmission time interval; or listening on, by the network device, the second cell in at least one transmission period, and determining, depending on whether interference is greater than a preset threshold, whether the transmission period of the first cell includes the contradirectional interference transmission time interval.

Several manners in which the network device determines whether the transmission period of the first cell includes the contradirectional interference transmission time interval are provided. The network device may perform the determining by itself, or by using the transmission time interval scheduling information sent by the other network device. During a specific implementation process, the network device may select different determining manners based on different cases, and this is relatively flexible.

With reference to the third possible implementation of the first aspect, in a fourth possible implementation of the first aspect, the transmission time interval scheduling information is used to indicate a transmission direction of each transmission time interval in the second cell, or is used to indicate a transmission time interval that is in the second cell and is configured for uplink-direction transmission, or is used to indicate a transmission time interval that is in the second cell and is configured for downlink-direction transmission, or is used to indicate a quantity of transmission time intervals that are in the second cell and are configured for uplink-direction transmission, or is used to indicate a quantity of transmission time intervals that are in the second cell and are configured for downlink-direction transmission.

The transmission time interval scheduling information of the second cell may indicate different content. Transmission time interval scheduling information that may be obtained is different based on factors such as different network statuses or different system settings. However, various cases that can be indicated by the transmission time interval scheduling information all fall within the protection scope of the embodiments of the present disclosure.

With reference to the fourth possible implementation of the first aspect, in a fifth possible implementation of the first aspect, if the transmission time interval scheduling information is used to indicate the quantity of transmission time intervals that are in the second cell and are configured for uplink-direction transmission, or is used to indicate the quantity of transmission time intervals that are in the second cell and are configured for downlink-direction transmission, the determining, based on the transmission time interval scheduling information, whether the transmission period of the first cell includes the contradirectional interference transmission time interval may be implemented in the following manner: determining, by the network device, based on the priority and the transmission time interval scheduling information, a transmission time interval that is in the transmission period and in the second cell and is configured for uplink-direction transmission and/or downlink-direction transmission; and determining, by the network device, based on the transmission time interval that is in the transmission period and in the second cell and is configured for uplink-direction transmission and/or downlink-direction transmission, whether the transmission period of the first cell includes the contradirectional interference transmission time interval.

If the transmission time interval scheduling information is used to indicate the quantity of transmission time intervals that are in the second cell and are configured for uplink-direction transmission, or is used to indicate the quantity of transmission time intervals that are in the second cell and are configured for downlink-direction transmission, and cannot directly indicate a case of the contradirectional interference transmission time interval, the network device further needs to determine the case of the contradirectional interference transmission time interval. The network device may directly determine, based on the priority of each transmission time interval in the transmission time interval set and the transmission time interval scheduling information, whether the transmission period of the first cell includes the contradirectional interference transmission time interval. This manner is relatively simple and easy to be implemented. It can be learned that, even if the transmission time interval scheduling information cannot directly indicate the case of the contradirectional interference transmission time interval, the network device may determine, based on the transmission time interval scheduling information and other auxiliary information (such as the priority), whether the transmission period of the first cell includes the contradirectional interference transmission time interval. That the contradirectional interference transmission time interval cannot be determined does not occur just due to that the transmission time interval scheduling information cannot directly indicate the case of contradirectional interference transmission time interval.

With reference to any possible implementation of the second possible implementation to the fifth possible implementation of the first aspect, in a sixth possible implementation of the first aspect, the indication information is carried in downlink control information, and the downlink control information is used to indicate an uplink data transmission resource.

In other words, the network device may add the indication information to a known message, and the indication information may be sent to the user equipment in time, or the indication information may be sent without additionally adding a new message, so that a transmission resource is saved.

With reference to any possible implementation of the second possible implementation to the sixth possible implementation of the first aspect, in a seventh possible implementation of the first aspect, the sending, by the network device, indication information to the user equipment based on a result of determining whether the contradirectional interference transmission time interval is included may be implemented in the following manner: sending, by the network device, first indication information to the user equipment when determining that the contradirectional interference transmission time interval is included, where the first indication information is used to indicate a first power control parameter used by the user equipment to perform uplink transmission within the contradirectional interference transmission time interval. In addition, the method further includes: sending, by the network device, second indication information to the user equipment, where the second indication information is used to indicate a second power control parameter. The second power control parameter is a default power control parameter, or a power control parameter used to perform uplink transmission at least within a non-contradirectional interference transmission time interval, where the non-contradirectional interference transmission time interval is a transmission time interval other than the contradirectional interference transmission time interval.

In other words, the network device may send different indication information to the user equipment based on different cases of the contradirectional interference transmission time interval of the first cell. If the first cell includes the contradirectional interference transmission time interval, the network device sends the first indication information to the user equipment, where the first indication information is used to indicate the first power control parameter. If the first cell does not include the contradirectional interference transmission time interval, the network device sends the second indication information to the user equipment, where the second indication information is used to indicate the second power control parameter. In other words, the user equipment may select different power control parameters based on different indication information, to calculate the uplink transmit power, and when configuring different power control parameters, the network device may consider the case of the contradirectional interference transmission time interval. For example, uplink transmit power calculated based on the first power control parameter may be greater than uplink transmit power calculated based on the second power control parameter. In this way, when the first cell does not have the contradirectional interference transmission time interval, data is sent by using smaller uplink transmit power, so that power consumption can be reduced; or when the first cell has the contradirectional interference transmission time interval, data is sent by using larger uplink transmit power, so that the impact brought by the contradirectional interference can be reduced as far as possible, and the data transmission quality can be improved.

According to a second aspect, a method for scheduling transmission in a wireless communications system is provided, and the method may be implemented by using user equipment. The method includes: receiving, by user equipment, downlink control information sent by a network device, where the downlink control information is used to indicate an uplink data transmission resource; and performing, by the user equipment, in a first cell, first-direction transmission with the network device by using at least one transmission time interval indicated by the downlink control information. The at least one transmission time interval is selected for the first cell by the network device from a transmission time interval set based on a priority of each transmission time interval used for the first-direction transmission in the transmission time interval set. The first-direction transmission is along a downlink direction from the network to the user equipment or along an uplink direction from the user equipment to the network device.

In the embodiments of the present disclosure, the transmission time interval set may be preset, and when scheduling the transmission time interval, the network device may schedule, for the user equipment, the transmission time interval from the transmission time interval set. If a plurality of network devices all preferentially schedule, for the user equipment, transmission time intervals from the transmission time interval set, different network devices have almost a same selection when selecting the transmission time intervals. Therefore, moments at which the different network devices perform uplink transmission may be the same. The user equipment performs transmission with the network device by using the transmission time interval selected in this way, so that a possibility that the uplink transmission is interfered with by downlink transmission in another cell can be reduced as far as possible, and transmission quality is improved.

With reference to the second aspect, in a first possible implementation of the second aspect, the user equipment may obtain indication information carried in the downlink control information, and the user equipment determines, based on the indication information, a power control parameter used to perform uplink transmission.

It can be learned based on the foregoing description that, the network device may send the indication information to the user equipment based on a case of whether the first cell has the contradirectional interference transmission time interval, and the user equipment may select a corresponding power control parameter based on the indication information. Therefore, the power control parameter selected by the user equipment may be considered as a power control parameter when a contradirectional interference case is considered. The uplink transmit power is calculated by using the power control parameter selected in this way, so that the data transmission quality can be improved.

With reference to the second aspect or the first possible implementation of the second aspect, in a second possible implementation of the second aspect, the obtaining, by the user equipment, indication information carried in the downlink control information may be implemented in the following manners: obtaining, by the user equipment, first indication information carried in the downlink control information, where the first indication information is used to indicate a first power control parameter used by the user equipment to perform uplink transmission within a contradirectional interference transmission time interval, where the contradirectional interference transmission time interval is a transmission time interval that is configured for uplink transmission in the first cell and configured for downlink transmission in a second cell; or obtaining, by the user equipment, second indication information carried in the downlink control information, where the second indication information is used to indicate a second power control parameter; and the second power control parameter is a default power control parameter, or a power control parameter used to perform uplink transmission at least within a non-contradirectional interference transmission time interval, where the non-contradirectional interference transmission time interval is a transmission time interval other than the contradirectional interference transmission time interval.

In other words, the network device configures different power control parameters for the user equipment depending on whether there is a factor of contradirectional interference, and the user equipment may select different power control parameters based on different indication information, to calculate the uplink transmit power. For example, uplink transmit power calculated based on the first power control parameter may be greater than uplink transmit power calculated based on the second power control parameter. In this way, when the first cell does not have the contradirectional interference transmission time interval, data is sent by using smaller uplink transmit power, so that power consumption can be reduced; or when the first cell has the contradirectional interference transmission time interval, data is sent by using larger uplink transmit power, so that impact brought by the contradirectional interference can be reduced as far as possible, and the data transmission quality can be improved.

With reference to the second possible implementation of the second aspect, in a third possible implementation of the second aspect, the user equipment further receives at least two sets of power control parameters sent by the network device, where the power control parameters are used to calculate uplink transmit power. The at least two sets of power control parameters include the first power control parameter and the second power control parameter.

In other words, after configuring the power control parameters for the user equipment, the network device needs to send the configured power control parameters to the user equipment. In this way, the user equipment may directly select, based on the indication information, a corresponding power control parameter to perform calculation, without requesting to obtain the power configuration parameter from the network device when using the power control parameter.

According to a third aspect, a network device is provided, and the device includes a processor. The processor is configured to: determine a priority of each transmission time interval used for first-direction transmission in a transmission time interval set; select, for a first cell, at least one transmission time interval from the transmission time interval set based on the priority; and perform, in the first cell, the first-direction transmission with the user equipment by using the selected at least one transmission time interval. The first-direction transmission is along a downlink direction from the network device to the user equipment or along an uplink direction from the user equipment to the network device.

With reference to the third aspect, in a first possible implementation of the third aspect, that the processor selects, for the first cell, the at least one transmission time interval from the transmission time interval set based on the priority may be implemented in the following manner: selecting the at least one transmission time interval from the transmission time interval set in descending order of the priorities.

With reference to the third aspect or the first possible implementation of the third aspect, in a second possible implementation of the third aspect, the network device further includes a transmitter. The processor is further configured to: determine whether a transmission period of the first cell includes a contradirectional interference transmission time interval; and send indication information to the user equipment by using the transmitter based on a result of determining, by a determining unit, whether the contradirectional interference transmission time interval is included. The indication information is used to indicate a power control parameter used by the user equipment to perform uplink transmission, and the contradirectional interference transmission time interval is a transmission time interval that is configured for uplink transmission in the first cell and configured for downlink transmission in a second cell.

With reference to the second possible implementation of the third aspect, in a third possible implementation of the third aspect, the network device further includes a receiver. That the processor determines whether the transmission period of the first cell includes the contradirectional interference transmission time interval may be implemented in the following manners: obtaining transmission time interval scheduling information of the second cell, and determining, based on the transmission time interval scheduling information, whether the transmission period of the first cell includes the contradirectional interference transmission time interval; or receiving, by using the receiver, transmission time interval scheduling information of the second cell that is sent by another network device corresponding to the second cell, and determining, based on the transmission time interval scheduling information, whether the transmission period of the first cell includes the contradirectional interference transmission time interval; or listening on the second cell in at least one transmission period, and determining, depending on whether interference is greater than a preset threshold, whether the transmission period of the first cell includes the contradirectional interference transmission time interval.

With reference to the third possible implementation of the third aspect, in a fourth possible implementation of the third aspect, the transmission time interval scheduling information is used to indicate a transmission direction of each transmission time interval in the second cell, or is used to indicate a transmission time interval that is in the second cell and is configured for uplink-direction transmission, or is used to indicate a transmission time interval that is in the second cell and is configured for downlink-direction transmission, or is used to indicate a quantity of transmission time intervals that are in the second cell and are configured for uplink-direction transmission, or is used to indicate a quantity of transmission time intervals that are in the second cell and are configured for downlink-direction transmission.

With reference to the fourth possible implementation of the third aspect, in a fifth possible implementation of the third aspect, if the transmission time interval scheduling information is used to indicate the quantity of transmission time intervals that are in the second cell and are configured for uplink-direction transmission, or is used to indicate the quantity of transmission time intervals that are in the second cell and are configured for downlink-direction transmission, that the processor determines, based on the transmission time interval scheduling information, whether the transmission period of the first cell includes the contradirectional interference transmission time interval may be implemented in the following manner: determining, based on the priority and the transmission time interval scheduling information, a transmission time interval that is in the transmission period and in the second cell and is configured for uplink-direction transmission and/or downlink-direction transmission; and determining, based on the transmission time interval that is in the transmission period and in the second cell and is configured for uplink-direction transmission and/or downlink-direction transmission, whether the transmission period of the first cell includes the contradirectional interference transmission time interval.

With reference to any possible implementation of the second possible implementation to the fifth possible implementation of the third aspect, in a sixth possible implementation of the third aspect, the indication information is carried in downlink control information, and the downlink control information is used to indicate an uplink data transmission resource.

With reference to any possible implementation of the second possible implementation to the sixth possible implementation of the third aspect, in a seventh possible implementation of the third aspect, that the processor sends, by using the transmitter, indication information to the user equipment based on a result of determining whether the contradirectional interference transmission time interval is included may be implemented in the following manner: sending, by using the transmitter, first indication information to the user equipment when determining that the contradirectional interference transmission time interval is included, where the first indication information is used to indicate a first power control parameter used by the user equipment to perform uplink transmission within the contradirectional interference transmission time interval. In addition, the processor is further configured to send, by using the transmitter, second indication information to the user equipment, where the second indication information is used to indicate a second power control parameter. The second power control parameter is a default power control parameter, or a power control parameter used to perform uplink transmission at least within a non-contradirectional interference transmission time interval, where the non-contradirectional interference transmission time interval is a transmission time interval other than the contradirectional interference transmission time interval.

According to a fourth aspect, user equipment is provided, and the user equipment includes a receiver and a processor. The receiver is configured to receive downlink control information sent by a network device, where the downlink control information is used to indicate an uplink data transmission resource. The processor is configured to perform, in a first cell, first-direction transmission with the network device by using at least one transmission time interval indicated by the downlink control information. The at least one transmission time interval is selected for the first cell by the network device from a transmission time interval set based on a priority of each transmission time interval used for the first-direction transmission in the transmission time interval set. The first-direction transmission is along a downlink direction from the network to the user equipment or along an uplink direction from the user equipment to the network device.

With reference to the fourth aspect, in a first possible implementation of the fourth aspect, the processor is further configured to: obtain indication information carried in the downlink control information, and determine, based on the indication information, a power control parameter used to perform uplink transmission.

With reference to the first possible implementation of the fourth aspect, in a second possible implementation of the fourth aspect, that the processor obtains the indication information carried in the downlink control information may be implemented in the following manners: obtaining first indication information carried in the downlink control information, where the first indication information is used to indicate a first power control parameter used by the user equipment to perform uplink transmission within a contradirectional interference transmission time interval, where the contradirectional interference transmission time interval is a transmission time interval that is configured for uplink transmission in the first cell and configured for downlink transmission in a second cell; or obtaining second indication information carried in the downlink control information, where the second indication information is used to indicate a second power control parameter; and the second power control parameter is a default power control parameter, or a power control parameter used to perform uplink transmission at least within a non-contradirectional interference transmission time interval, where the non-contradirectional interference transmission time interval is a transmission time interval other than the contradirectional interference transmission time interval.

With reference to the second possible implementation of the fourth aspect, in a third possible implementation of the fourth aspect, the receiver is further configured to receive at least two sets of power control parameters sent by the network device, where the power control parameters are used to calculate uplink transmit power. The at least two sets of power control parameters include the first power control parameter and the second power control parameter.

According to a fifth aspect, a network device is provided, and the network device may include a functional unit configured to perform the method in the first aspect or any possible implementation of the first aspect.

According to a sixth aspect, user equipment is provided, and the user equipment may include a functional unit configured to perform the method in the second aspect or any possible implementation of the second aspect.

According to a seventh aspect, an embodiment of the present disclosure provides a computer storage medium, to store a computer software instruction used by the network device, and the computer storage medium includes a program designed for the network device, to perform the first aspect or any possible implementation of the first aspect.

According to an eighth aspect, an embodiment of the present disclosure provides a computer storage medium, to store a computer software instruction used by the user equipment, and the computer storage medium includes a program designed for the user equipment, to perform the second aspect or any possible implementation of the second aspect.

In the embodiments of the present disclosure, the transmission time interval set is preset, and moments at which the plurality of network devices perform uplink transmission are enabled to be the same as far as possible, so that the possibility that the uplink transmission is interfered with by the downlink transmission in the another cell is reduced as far as possible, and the transmission quality is improved.

DESCRIPTION OF EMBODIMENTS

Figure 1:
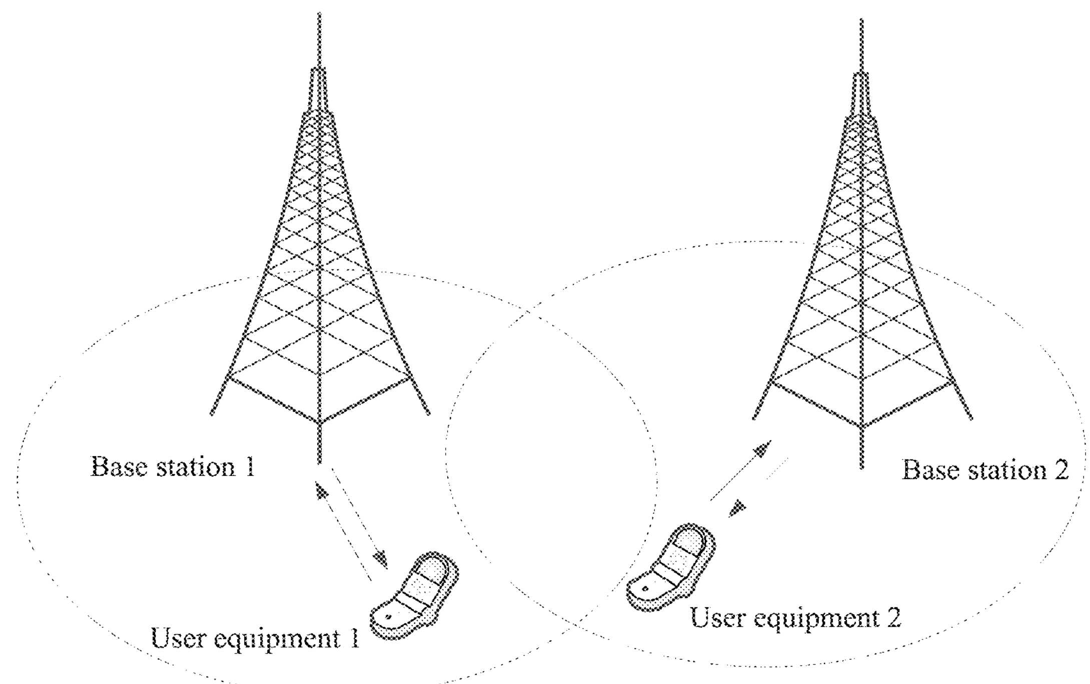
FIG. 1 is a schematic diagram of an disclosure scenario according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the embodiments of the present disclosure.

The technology described in this specification may be applied to various communications systems, for example, the third generation mobile communications system (3G), the fourth generation mobile communications system (4G), the fifth generation mobile communications system (5G), and a next generation communications system. For example, the communications systems may be a Global System for Mobile communications (GSM), a Code Division Multiple Access (CDMA) system, a Time Division Multiple Access (TDMA) system, Wideband Code Division Multiple Access (WCDMA) system, a Frequency Division Multiple Access (FDMA) system, an Orthogonal Frequency Division Multiple Access (OFDMA) system, a Single Carrier Frequency Division Multiple Access (SC-FDMA) system, a General Packet Radio Service (GPRS) system, an LTE system, a future 5G system, and another possible communications system.

In the following, some terms in the embodiments of the present disclosure are described, so as to help persons skilled in the art have a better understanding.

(1) User equipment is a device that provides voice and/or data connectivity to a user, and may include, for example, a handheld device having a wireless connection function or a processing device connected to a wireless modem. The user equipment may communicate with a core network by using a radio access network (RAN), and exchange a voice and/or data with the RAN. The user equipment may include UE, a wireless terminal device, a mobile terminal device, a subscriber unit, a subscriber station, a mobile station, a mobile console, a remote station, an access point (AP), a remote terminal device, an access terminal device, a user terminal device, a user agent, a user device, or the like. For example, the user equipment may include a mobile phone (or referred to as a "cellular" phone), a computer having a mobile terminal device, or a portable, a pocket-sized, a handheld, a computer-built-in, or an in-vehicle mobile apparatus. For example, it may be a device such as a personal communication service (PCS) phone, a cordless telephone set, a Session Initiation Protocol (SIP) phone, a wireless local loop (WLL) station, or a personal digital assistant (PDA).

(2) A network device, including, for example, a base station (such as an access point), may be a device that is on an access network and that communicates with a wireless terminal device on an air interface by using one or more sectors. The base station may be configured to mutually convert a received over-the-air frame and an Internet Protocol (IP) packet and serve as a router between a wireless terminal device and a rest portion of an access network, where the rest portion of the access network may include an IP network. The base station may further coordinate attribute management of the air interface. For example, the base station may include a radio network controller (RNC) or a base station controller (BSC), or may include an evolved NodeB (NodeB or eNB or e-NodeB) in an evolved LTE system (LTE-Advanced, LTE-A), or may include a next generation node B (NG-NB) in the 5G system. This is not limited in the embodiments of the present disclosure.

(3) Contradirectional interference: If user equipment transmits, in a serving cell of the user equipment, uplink data by using one TTI, and a neighboring cell of the serving cell of the user equipment simultaneously transmits downlink data by using the TTI, it is considered that when the user equipment transmits the uplink data by using the TTI, the contradirectional interference exists, to be specific, interference from downlink transmission in the neighboring cell to uplink transmission in the cell in which the uplink transmission is performed.

(4) A transmission period is a period of time whose duration is an integer multiple of the TTI. If the TTI is a sub-frame and the TTI is 1 ms, the transmission period may be 10 ms.

(5) A transmission time interval set may be some transmission time intervals in a transmission period, or may be all transmission time intervals in a transmission period.

(6) The terms "system" and "network" may be used interchangeably in the embodiments of the present disclosure. "Cell" and "carrier" may be used interchangeably. "A plurality of" means two or more than two. In view of this, in the embodiments of the present disclosure, "a plurality of" may alternatively be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise.

FIG. 1 shows a disclosure scenario according to an embodiment of the present disclosure. FIG. 1 includes two network devices and two user equipments. Base stations, namely, a base station 1 and a base station 2, are used as an example of the network devices. The base station 1 serves user equipment 1, and the base station 2 serves user equipment 2. A serving cell provided by the base station 1 to the user equipment 1 and a serving cell provided by the base station 2 to the user equipment 2 are mutual neighboring cells. A flexible duplex technology is used for the base station 1 and the base station 2. In this case, assuming that the user equipment 1 performs, in the serving cell of the user equipment 1, uplink transmission to the base station 1 by using one TTI, and the base station 2 performs, in the serving cell of the user equipment 2, downlink transmission to the user equipment 2 by using the TTI, the downlink transmission in the serving cell of the user equipment 2 causes contradirectional interference to the uplink transmission in the serving cell of the user equipment 1.

In view of this, in this embodiment of the present disclosure, a TTI set may be preset, to stipulate in advance that all network devices in a preset area preferentially schedule, for user equipment, TTIs from the TTI set. The network devices in the preset area may be understood as network devices in a cell covered by a same frequency band. In this way, when scheduling a TTI, a network device schedules, for user equipment, the TTI from the TTI set. Different network devices have almost a same selection when selecting TTIs. Therefore, moments at which the different network devices perform uplink transmission may be the same, so that a possibility that the uplink transmission is interfered with by downlink transmission in another cell is reduced as far as possible, and transmission quality is improved. For example, a first direction is an uplink direction, and the base station 1 schedules, for the user equipment 1, a first TTI from the TTI set, to perform uplink transmission. If needing to schedule a TTI for the user equipment 2, to perform uplink transmission, the base station 2 also performs the scheduling preferentially from the TTI set. Therefore, the base station 2 is also likely to schedule the first TTI for the user equipment 2, to perform uplink transmission, and then no contradirectional interference exists within the first TTI. Alternatively, even if the base station 2 does not schedule uplink transmission for the user equipment 2, and needs to schedule downlink transmission for the user equipment 2, because the base station 2 preferentially schedules the uplink transmission from the TTI set, the scheduling may be naturally preferentially performed not from the TTI set when the downlink transmission is scheduled, and then there is a relatively small probability that a TTI used in the uplink transmission is the same as a TTI used in the downlink transmission, thereby reducing contradirectional interference cases.

In this embodiment of the present disclosure, the network device determines a priority of each transmission time interval used for first-direction transmission in a transmission time interval set, where the first-direction transmission is along a downlink direction from the network device to user equipment or along an uplink direction from the user equipment to the network device. The network device selects, for a first cell, at least one transmission time interval from the transmission time interval set based on the priority. In addition, the network device sends downlink control information (DCI) to the user equipment, where the downlink control information is used to indicate an uplink data transmission resource, and then after receiving the DCI, the user equipment may perform, in the first cell, transmission with the network device in the first direction by using the at least one transmission time interval indicated by the DCI. In other words, the network device may perform, in the first cell, first-direction transmission with the user equipment by using the selected at least one transmission time interval. To better understand the technical solution, the following provides detailed descriptions by using two embodiments. In the following two embodiments, examples in which the first direction is respectively the uplink direction and the downlink direction are used. In this embodiment of the present disclosure, when the transmission time interval set includes some transmission time intervals of a transmission period, other transmission time intervals may be fixedly uplink or downlink transmission time intervals.

It should be noted that, that a transmission time interval is used as the first-direction transmission means that some or all symbols of the transmission time interval are used as the first-direction transmission.

Figure 2A:
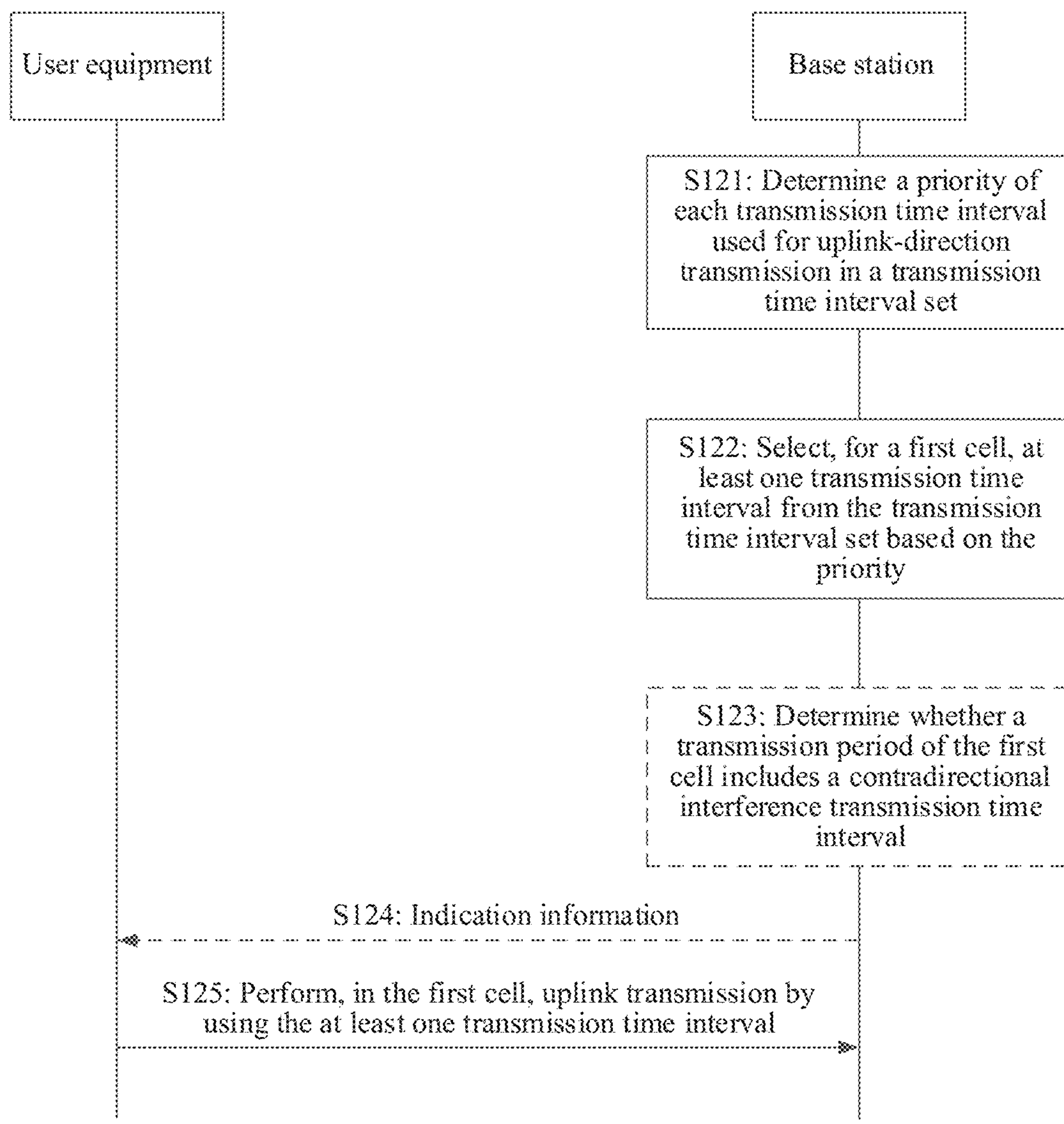
FIG. 2A is a flowchart of a method for scheduling transmission in a wireless communications system according to an embodiment of the present disclosure.

Referring to FIG. 2A, an embodiment of the present disclosure provides a method for scheduling transmission in a wireless communications system. In this embodiment of the present disclosure, an example in which data needs to be transmitted from the user equipment in the uplink direction is used, that is, the first direction is the uplink direction. It may be considered that, a TDD system is used as an example in this embodiment of the present disclosure.

In the TDD system, each TTI may be flexibly scheduled for uplink transmission or downlink transmission. Therefore, on an entire network or in a cell group, if TTIs that are scheduled in different cells as uplink are different, contradirectional interference may exist. In particular, if uplink transmission in a cell is interfered with by downlink transmission in a neighboring cell, the contradirectional interference is relatively serious, and consequently the uplink transmission may fail. To reduce contradirectional interference in the system, a TTI set is defined in advance in this embodiment of the present disclosure. The TTI set may include at least one TTI. When scheduling an uplink TTI, a network device preferentially schedules a TTI in the TTI set, in other words, when there is an uplink service, the network device preferentially selects a TTI from the TTI set to perform uplink transmission. In this way, the contradirectional interference can be reduced as far as possible. The TTI included in the TTI set may be preferentially scheduled as the first direction, but is not necessarily scheduled as the first direction. All network devices in a preset area preferentially schedule a TTI, for the user equipment, from the TTI set, to perform uplink transmission. A range of the preset area may be a coverage range of the entire network, or may be a coverage range of an assigned cell group. If a cell group is assigned, usually the assignment may be performed based on a distance between network devices, to be specific, cells provided by network devices relatively close to each other are assigned to one cell group. In this way, different cell groups can share a TTI set, or different TTI sets may be defined for different cell groups. The cell group is a group of cells. In this group of cells, power interfering with each other is relatively large, and therefore a same TTI set and scheduling rule are used.

For example, in a 5G system, four TTI structures may be defined:

1. DL-only transmission time interval, namely, a TTI used for downlink transmission.

2. UL-only transmission time interval, namely, a TTI used for uplink transmission.

3. Mix transmission time interval, to be specific, both uplink transmission and downlink transmission may be performed in a same TTI. Mix transmission time intervals are further categorized into two types: DL-dominate transmission time interval and UL-dominate transmission time interval. The DL-dominate transmission time interval is mainly used to transmit downlink data, but may alternatively be used to transmit uplink control information. The UL-dominate transmission time interval is mainly used to transmit uplink data, but may alternatively be used to transmit downlink control information.

Both an UL-only transmission time interval and an UL-dominate transmission time interval in a mix transmission time interval may be used as TTIs added to a TTI set in this embodiment of the present disclosure.

During the following description process, the disclosure scenario shown in FIG. 1 is used as an example. In addition, during the following description process, an example in which a network device is a base station is used, and then, the network device may be the base station 1 or the base station 2 in FIG. 1. If the network device is the base station 1 in FIG. 1, the user equipment in this embodiment of the present disclosure is the user equipment 1 in FIG. 1. If the network device is the base station 2 in FIG. 1, the user equipment in this embodiment of the present disclosure is the user equipment 2 in FIG. 1.

S121: The base station determines a priority of each TTI used for uplink-direction transmission in a TTI set.

In this embodiment of the present disclosure, priorities of all TTIs or some TTIs used for the uplink-direction transmission in the TTI set may be defined in advance. For example, a priority may be defined for each TTI included in the TTI set, and priorities of different TTIs are different. In this way, when determining to perform uplink transmission, the base station may determine the priority of each TTI used for the uplink-direction transmission in the TTI set.

Which TTIs are selected as the TTIs in the TTI set and how to set the priorities for the TTIs in the TTI set may be defined by a protocol or a standard in advance, or may be stipulated by an operator in advance. This is not limited in this embodiment of the present disclosure.

In addition, when there is no uplink service, the TTIs in the TTI set may all be scheduled for the downlink transmission, or may not be scheduled. In other words, in this embodiment of the present disclosure, an uplink priority of each TTI in the TTI set is not 10,%; and each TTI is merely preferentially scheduled as uplink, and this does not mean that each TTI can be scheduled only as uplink.

S122: The base station selects, for a first cell, at least one TTI from the TTI set based on the priority.

When scheduling a TTI from the TTI set to perform uplink transmission, the base station may perform the scheduling based on a priority of the TTI, for example, perform the scheduling in descending order of priorities, or perform the scheduling in ascending order of priorities. In this way, base stations on the entire network or in the cell group all perform scheduling by using a same TTI set and based on a same scheduling rule, so that uplink and downlink TTIs on the entire network or in the cell group may be the same as far as possible, and contradirectional interference cases on the entire network or in the cell group can be reduced to a great extent. The scheduling rule herein may be understood as which TTI is scheduled as an uplink direction first and which TTI is scheduled as an uplink direction later. Certainly, setting the priority for each TTI and performing scheduling based on the priority is only a scheduling manner, and an objective is that network devices may all perform scheduling in the TTI set based on the same scheduling rule. Therefore, all manners enabling network devices to perform scheduling in the TTI set based on the same scheduling rule fall within the protection scope of this embodiment of the present disclosure.

Figures 3A, 3B, 3C, 3D, 4:
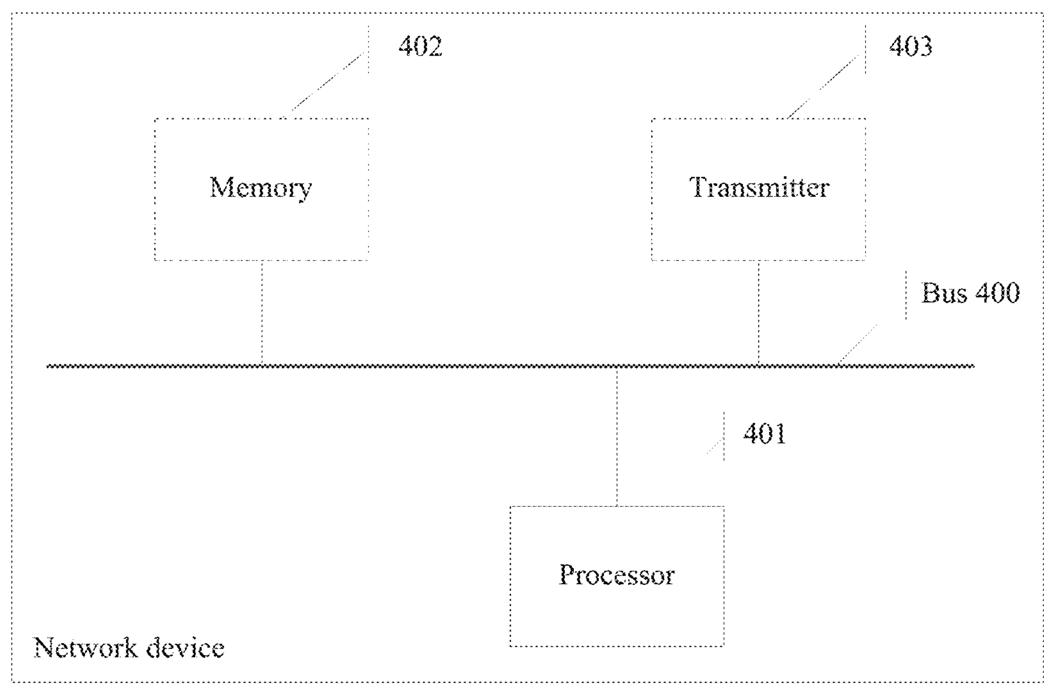
FIG. 3A to FIG. 3D are schematic diagrams of several TTI sets according to an embodiment of the present disclosure.
FIG. 4 is a schematic structural diagram of a network device according to an embodiment of the present disclosure.

FIG. 3A shows an example of a TTI set in a transmission period. An example in which the transmission period includes 10 TTIs is used. In this example, some TTIs of the 10 TTIs are assigned to a TTI set. The TTIs assigned to the TTI set are TTIs marked with digits in FIG. 3A. The mark digits indicate priorities of the TTIs. To be specific, a digit 1 indicates a first priority, a digit 2 indicates a second priority, a digit 3 indicates a third priority, and a digit 4 indicates a fourth priority. The first priority is the highest priority.

When scheduling a TTI from the TTI set in FIG. 3A to perform uplink transmission, the base station performs the scheduling, for example, in descending order of priorities of four TTIs included in the TTI set. For example, the base station determines, based on an uplink service load status, a quantity of uplink TTIs needed in a transmission period. If three TTIs are needed, the base station schedules TTIs marked with digits 1, 2, and 3 in FIG. 3A as uplink TTIs.

FIG. 3B shows an example of a TTI set in a transmission period. An example in which the transmission period includes 10 TTIs is used. In this example, all TTIs of the 10 TTIs are assigned to a TTI set. The TTIs assigned to the TTI set are TTIs marked with digits in FIG. 3B. The mark digits indicate priorities of the TTIs. To be specific, a digit 1 indicates a first priority, a digit 2 indicates a second priority, and the rest can be deduced by analogy. The first priority is the highest priority.

Similarly, when scheduling a TTI from the TTI set in FIG. 3B to perform uplink transmission, the base station also performs the scheduling, for example, in descending order of priorities of four TTIs included in the TTI set. For example, the base station determines, based on an uplink service load status, a quantity of uplink TTIs needed in a transmission period. If four TTIs are needed, the base station schedules TTIs marked with digits 1, 2, 3, and 4 in FIG. 3B as uplink TTIs.

It can be learned from the descriptions of FIG. 3A and FIG. 3B that, in this embodiment of the present disclosure, the TTI set may be for the transmission period, to be specific, there may be one TTI set for each transmission period. Therefore, TTI sets may be the same for different transmission periods, or TTI sets may be different for different transmission periods. This may be defined by a protocol or a standard in advance, or may be stipulated by an operator in advance. This is not limited in this embodiment of the present disclosure.

S123: Determine whether a transmission period of the first cell includes a contradirectional interference transmission time interval.

Uplink service load of each cell is different. Even if a same TTI set and a same scheduling rule are used, an uplink-downlink configuration of each cell may be different. The TTI set and the scheduling rule can reduce contradirectional interference as far as possible. However, because the uplink service load is different and each cell has a different quantity of uplink TTIs, the contradirectional interference may still exist. Therefore, in this embodiment of the present disclosure, at least two sets of power control parameters may be configured by a base station, and the user equipment may calculate uplink transmit power by using the power control parameters. The at least two sets of power control parameters may include a first power control parameter and a second power control parameter. The first power control parameter is a power control parameter when a contradirectional interference TTI exists, and the second power control parameter is a power control parameter when no contradirectional interference TTI exists. Alternatively, it is understood that, when the user equipment performs uplink transmission within the contradirectional interference TTI, the first power control parameter may be selected. The second power control parameter is a default power control parameter. Alternatively, when the user equipment performs uplink transmission at least within a non-contradirectional interference TTI, the second power control parameter may be selected. The base station may send the at least two sets of power control parameters to the user equipment. Therefore, when no contradirectional interference TTI exists, the user equipment may calculate the uplink transmit power based on the second power control parameter. In other words, when the user equipment performs uplink transmission within the non-contradirectional interference TTI, the first power control parameter is used. When the contradirectional interference TTI exists, the user equipment may calculate the uplink transmit power based on the first power control parameter. In other words, when the user equipment performs uplink transmission within the contradirectional interference TTI, the first power control parameter is used. The uplink transmit power calculated based on the first power control parameter is usually greater than the uplink transmit power calculated based on the first power control parameter. In other words, impact from contradirectional interference is reduced as far as possible by increasing the uplink transmit power. The contradirectional interference TTI is a TTI that is configured for uplink transmission in the first cell and configured for downlink transmission in a second cell. The non-contradirectional interference TTI is a TTI other than the contradirectional interference TTI. The second cell may be a neighboring cell of the first cell, or a cell close to the first cell. Any cell that can cause contradirectional interference to the first cell may be the second cell.

The first power control parameter refers to a set of power control parameter, and the second power control parameter also refers to a set of power control parameter. The first power control parameter and the second power control parameter are only names provided for convenience of description in this embodiment of the present disclosure.

As described above, the user equipment may select a power control parameter based on a status of the contradirectional interference. The following describes how the user equipment learns of the status of the contradirectional interference TTI. In this embodiment of the present disclosure, a base station may learn of the status of the contradirectional interference TTI. To be specific, the base station may determine whether the transmission period of the first cell includes the contradirectional interference TTI, and then sends indication information to the user equipment based on a result of determining whether the contradirectional interference TTI is included. The indication information is used to indicate a power control parameter used by the user equipment to perform uplink transmission. If downlink data is simultaneously transmitted in a neighboring cell of a cell by using a TTI when uplink data is transmitted in the cell by using the TTI, it is determined that contradirectional interference exists when the uplink data is transmitted by using the TTI, that is, the TTI is a contradirectional interference TTI. Therefore, for a base station, to determine whether a transmission period of a serving cell includes a contradirectional interference TTI, the base station needs to know a TTI scheduling status of a neighboring cell of the serving cell in the transmission period. In other words, the base station may obtain TTI scheduling information of the neighboring cell of the serving cell. The TTI scheduling information can indicate the TTI scheduling status of the neighboring cell. The base station can determine, based on the TTI scheduling information of the neighboring cell of the serving cell, whether the transmission period of the serving cell includes the contradirectional interference TTI. The base station can obtain TTI scheduling information of the neighboring cell in at least one transmission period. In this embodiment of the present disclosure, an example in which TTI scheduling information of the neighboring cell in one transmission period is obtained is used. To be specific, to determine whether the transmission period of the serving cell includes the contradirectional interference TTI, the base station needs to obtain the TTI scheduling information of the neighboring cell in the transmission period. Certainly, for a serving cell, there may be one or more neighboring cells, and the base station may obtain TTI scheduling information of one neighboring cell or may obtain TTI scheduling information of a plurality of neighboring cells. The base station determines a contradirectional interference case of the serving cell based on all the obtained TTI scheduling information. In this embodiment of the present disclosure, descriptions are provided by using an example in which the serving cell is the first cell, and the neighboring cell of the first cell is the second cell. In this embodiment of the present disclosure, a transmission period may be used as a unit. To be specific, when obtaining TTI scheduling information of the second cell each time, the base station can obtain TTI scheduling information of one transmission period, for example, obtain TTI scheduling information of a next transmission period.

If the first cell and the second cell are served by a same base station, the base station may directly obtain the TTI scheduling information of the second cell. If the first cell and the second cell are served by different base stations, a base station serving the first cell may obtain the TTI scheduling information of the second cell in different manners. In a possible implementation, the base station serving the first cell interacts with a base station serving the second cell, to receive the TTI scheduling information of the second cell that is sent by the base station serving the second cell. Base stations may exchange TTI scheduling information with each other by using a wireless backhaul resource, or by using an X2 interface. This is not limited in this embodiment of the present disclosure. Alternatively, in a possible implementation, the base station serving the first cell may listen on the second cell in at least one transmission period, to determine interference generated by the second cell. If the interference generated by the second cell is greater than a preset threshold, the base station serving the first cell determines that the transmission period of the first cell includes the contradirectional interference TTI. If the interference generated by the second cell is not greater than a preset threshold, the base station serving the first cell determines that the transmission period of the first cell does not include the contradirectional interference TTI. If the first cell and the second cell are served by different base stations, the base station performing the steps in the embodiment shown in FIG. 2 is the base station serving the first cell.

In this embodiment of the present disclosure, the TTI scheduling information is used to indicate a transmission direction of each TTI that is in a transmission period and in the second cell, or is used to indicate a TTI that is in a transmission period and in the second cell and is configured for uplink-direction transmission, or is used to indicate a TTI that is in a transmission period and in the second cell and is configured for downlink-direction transmission, or is used to indicate a quantity of TTIs that are in a transmission period and in the second cell and are configured for uplink-direction transmission, or is used to indicate a quantity of TTIs that are in a transmission period and in the second cell and are configured for downlink-direction transmission. In other words, the TTI scheduling information may be used to indicate different content, and different TTI scheduling information may be configured based on an actual case.

If the TTI scheduling information of the second cell is used to indicate a transmission direction of each TTI that is in a transmission period and in the second cell, or is used to indicate a TTI that is in a transmission period and in the second cell and is configured for uplink-direction transmission, or is used to indicate a TTI that is in a transmission period and in the second cell and is configured for downlink-direction transmission, the base station may directly determine, based on the TTI scheduling information of the second cell, whether the transmission period of the first cell includes the contradirectional interference TTI. This manner is relatively simple. If the TTI scheduling information of the second cell is used to indicate a quantity of TTIs that are in a transmission period and in the second cell and are configured for uplink-direction transmission, or is used to indicate a quantity of TTIs that are in a transmission period and in the second cell and are configured for downlink-direction transmission, but cannot directly indicate the status of the contradirectional interference TTI, that the base station determines, based on the TTI scheduling information of the second cell, whether the transmission period of the first cell includes the contradirectional interference TTI may be implemented in the following manner: determining, by the base station based on the priority of the TTI included in the TTI set and the TTI scheduling information of the second cell, the TTI that is in the transmission period and in the second cell and is configured for the uplink-direction transmission and/or the downlink-direction transmission, and determining, by the base station based on the TTI that is in the transmission period and in the second cell and is configured for the uplink-direction transmission and/or the downlink-direction transmission, whether the transmission period of the first cell includes the contradirectional interference TTI.

S124: The base station sends indication information to the user equipment based on a result of determining whether the contradirectional interference transmission time interval is included, where the indication information is used to indicate a power control parameter used by the user equipment to perform uplink transmission, and then the user equipment receives the indication information.

After the base station determines, based on the obtained TTI scheduling information, whether the transmission period of the first cell includes the contradirectional interference TTI, the base station may send the indication information to the user equipment based on the result of determining whether the contradirectional interference TTI is included, to indicate the power control parameter used by the user equipment to perform uplink transmission. For example, if the base station determines that the transmission period of the first cell includes the contradirectional interference TTI, the base station sends first indication information to the user equipment. The first indication information is used to indicate a first power control parameter used by the user equipment to perform uplink transmission within the contradirectional interference TTI. If the base station determines that the transmission period of the first cell does not include the contradirectional interference TTI, the base station sends second indication information to the user equipment. The second indication information is used to indicate a second power control parameter.

In this embodiment of the present disclosure, the base station may send the indication information to the user equipment by adding the indication information to DCI, and the DCI is used to indicate an uplink data transmission resource. For example, the base station sends DCI to the user equipment. The DCI may instruct to transmit uplink data, in the first cell, to the base station by using at least one TTI. The at least one TTI is scheduled by the base station from the TTI set. In addition, the indication information is carried in the DCI. For example, the indication information occupies one bit in the DCI. The user equipment may determine, based on the indication information, whether the transmission period of the first cell includes the contradirectional interference TTI, and determine a used power control parameter based on the indication information.

S123 and S124 are optional steps. Therefore, in FIG. 2A, a box used to indicate S123 and an arrow used to indicate S124 are drawn in dashed lines, to distinguish from the mandatory steps. Certainly, if S124 is not performed, the base station may alternatively instruct, by using the DCI, the user equipment to perform uplink transmission.

S125: The user equipment performs, in the first cell, uplink-direction transmission to the base station by using at least one TTI indicated by received DCI.

After receiving the DCI, the user equipment determines the at least one TTI used to perform uplink transmission. In addition, if the DCI carries the indication information, the user equipment may determine, based on the indication information, to use which set of power control parameter, and then calculate the uplink transmit power based on the selected power control parameter.

The following briefly describes a manner for calculating the uplink transmit power, to clarify how the user equipment performs the calculation.

In a possible implementation, the uplink transmit power is calculated by using the following formula:

$$P_{PUSCH,c}(i)=\min\left\{\begin{matrix}P_{CMAX,c}(i),\\ 10\log_{10}(M_{PUSCH,c}(i))+P_{O\_PUSCH,c}(j)+\\ \alpha_c(j)\cdot PL_c+\Delta_{TF,c}(i)+f_c(i)\end{matrix}\right\} \quad (1)$$

In the formula (1), $P_{PUSCH,c}(i)$ indicates the calculated uplink transmit power, $P_{CMAX,c}(i)$ indicates largest transmit power of the user equipment on this carrier, and i indicates a sequence number of a TTI, or may be understood as indicating a moment of this uplink sending. For example, if the TTI is a sub-frame, i is a sub-frame number. A value of j may be 0, 1, or 2, and may be a different value based on a different usage scenario. $M_{PUSCH,c}(i)$ is a quantity of resource blocks (RB) used on a physical uplink shared channel (Physical Uplink Shared Channel, PUSCH), $PL_c$ is a path loss, $\Delta_{TF,c}(i)$ is related to a modulation and coding scheme (MCS) used on the PUSCH, and $f_c(i)$ is related to a power control command (TPC command). The power control command is usually sent in the DCI. $P_{O\_PUSCH,c}(j)=P_{O\_UE\_PUSCH,c}(j)+P_{O\_NOMINAL\_PUSCH,c}(j)$, where $P_{O\_UE\_PUSCH,c}(j)$ indicates a user equipment-level parameter, $P_{O\_NOMINAL\_PUSCH,c}(j)$ indicates a cell-level parameter, and $\alpha_c((j)$ indicates path loss compensation. The set of power control parameter includes $P_{O\_PUSCH,c}(j)$, $P_{O\_NOMINAL\_PUSCH,c}(j)$, and $\alpha_c(j)$ thereof. In other words, adjustment of the power control parameter can enable the uplink transmit power calculated by the user equipment to be different.

In addition, the formula (1) further includes a parameter $f_c(i)$. $f_c(i)$ is categorized into two types: accumulative and non-accumulative. Specifically, which type is used is notified by the base station to the user equipment through signaling.

Non-accumulative: $f_c(i)=\delta_{PUSCH,c}(i-K_{PUSCH,c})$, where $\delta_{PUSCH,c}$ is the power control command, i indicates a sequence number of a TTI, or may be understood as indicating the moment of this uplink sending, and $K_{PUSCH}$ indicates a difference between the moment of this uplink sending and a moment of sending of the DCI carrying the power control command. In other words, a power control command used in uplink transmission performed at an i moment is notified at an $i-K_{PUSCH}$ moment.

Accumulative: $f_c(i)=f_c(i-1)+\delta_{PUSCH,c}(i-K_{PUSCH})$, where definitions of $\delta_{PUSCH,c}$, i, and $K_{PUSCH}$ are the same as those in the non-accumulative type, and $f_c(i)$ used in uplink transmission performed at an i moment is related to $f_c(i-1)$ used in uplink transmission performed at an i−1 moment and a power control command notified at an $i-K_{PUSCH}$ moment. For the first power control parameter and the second power control parameter, power control commands notified by the base station may be different, and the two power control commands cannot be accumulated with each other. Therefore, for the first power control parameter and the second power control parameter, $f_c(i)$ is separately accumulated.

For example, the indication information sent by the base station to the user equipment is indicated by using one bit. If a value of the bit is "0", it indicates that at least one TTI scheduled by the DCI is a TTI of a first type. In other words, the transmission period of the first cell does not include the contradirectional interference TTI. It may be understood as that the indication information in this case is the second indication information. Then, the user equipment may determine to calculate the uplink transmit power by using the second power control parameter, and an accumulated value of TTIs of the first type is used for $f_c(i)$. If a value of the bit is "1", it indicates that at least one TTI scheduled by the DCI is a TTI of a second type. In other words, the transmission period of the first cell includes the contradirectional interference TTI. It may be understood as that the indication information in this case is the first indication information. Then, the user equipment may determine to calculate the uplink transmit power by using the first power control parameter, and an accumulated value of TTIs of the second type is used for $f_c(i)$. Certainly, before selecting the power control parameter, the user equipment may first receive the at least two sets of power control parameters sent by the base station, including the first power control parameter and the second power control parameter.

The foregoing describes a case in which the base station schedules a TTI to perform uplink transmission. In this embodiment of the present disclosure, if the base station needs to schedule, in a transmission period, a TTI to perform downlink transmission, one manner is that the base station preferentially schedules a TTI that does not belong to the TTI set. If all TTIs that do not belong to the TTI set are used up, or all TTIs in a transmission period belong to the TTI set, the base station may alternatively schedule a TTI from the TTI set to perform downlink transmission. When the base station schedules the TTI from the TTI set to perform downlink transmission, the base station may perform the scheduling based on a scheduling rule reverse to that for scheduling the TTI for the uplink transmission. For example, if the base station performs the scheduling for the uplink transmission in descending order of priorities of TTIs in the TTI set, the base station may perform the scheduling for the downlink transmission in ascending order of the priorities of the TTIs in the TTI set. In this way, a conflict between uplink and downlink is avoided as far as possible, and occurrence of contradirectional interference cases is reduced as far as possible.

In this embodiment of the present disclosure, the TTI set, the priorities of the TTIs in the TTI set, and the scheduling rules are defined in advance, so that the contradirectional interference between cells can be reduced as far as possible. The base station dynamically notifies, by using the DCI, a set of power control parameter used for an uplink TTI, so that an uplink receiving signal to interference plus noise ratio (SINR) can be increased.

Figure 2B:
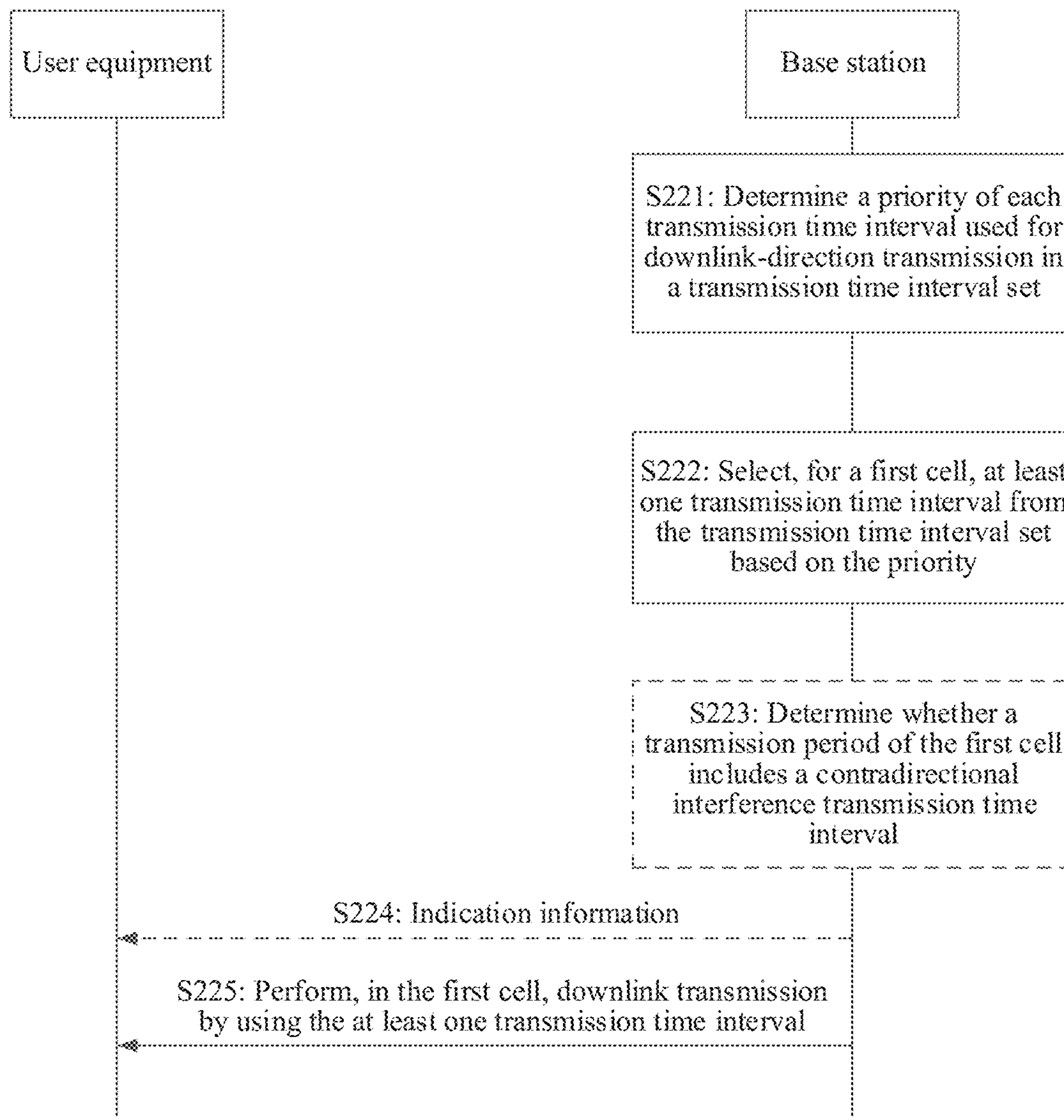
FIG. 2B is a flowchart of a method for scheduling transmission in a wireless communications system according to an embodiment of the present disclosure.

The embodiment shown in FIG. 2A mainly describes a case of the TDD system. Referring to FIG. 2B, the following provides another embodiment, describing a method for scheduling transmission in a wireless communications system. In this embodiment of the present disclosure, an example in which data needs to be transmitted to the user equipment in a downlink direction is used. In other words, the first direction is the downlink direction. It may be considered that, an FDD system is used as an example in this embodiment of the present disclosure.

In the FDD system, there are an FDD downlink (DL) frequency band and an FDD uplink (UL) frequency band. The FDD DL frequency band is used for downlink transmission, and the FDD UL frequency band is used for uplink transmission. Considering that there are usually relatively many downlink services, after a flexible duplex technology is used, some TTIs in the FDD uplink frequency band may be used to perform downlink transmission. In this case, if TTIs scheduled as downlink in different cells are different, relatively serious contradirectional interference exists. In particular, if uplink transmission in a serving cell is interfered with by downlink transmission in a neighboring cell, the uplink transmission may fail. To reduce contradirectional interference in the system, a TTI set is defined in advance in the FDD UL frequency band in this embodiment of the present disclosure. The TTI set includes at least one TTI in the FDD UL frequency band. When scheduling a downlink TTI, a network device preferentially schedules a TTI in the TTI set, in other words, when there is a downlink service, the network device preferentially selects a TTI from the TTI set to perform downlink transmission. In this way, the contradirectional interference can be reduced as far as possible. All network devices in a preset area preferentially schedule, for user equipment, a TTI from the TTI set, to perform downlink transmission. A range of the preset area may be a coverage range of the entire network, or may be a coverage range of an assigned cell group. If a cell group is assigned, usually the assignment may be performed based on a distance between network devices, to be specific, cells provided by network devices relatively close to each other are assigned to one cell group. In this way, different cell groups can share a TTI set, or different TTI sets may be defined for different cell groups.

Using the four TTI structures in the 5G system described in the foregoing as an example, both a DL-only transmission time interval and a DL-dominate transmission time interval in a mix transmission time interval may be used as TTIs added to a TTI set in this embodiment of the present disclosure.

During the following description process, the disclosure scenario shown in FIG. 1 is used as an example. In addition, during the following description process, an example in which a network device is a base station is used as an example, and then, the network device may be the base station 1 or the base station 2 in FIG. 1. If the network device is the base station 1 in FIG. 1, the user equipment in this embodiment of the present disclosure is the user equipment 1 in FIG. 1. If the network device is the base station 2 in FIG. 1, the user equipment in this embodiment of the present disclosure is the user equipment 2 in FIG. 1.

S221: The base station determines a priority of each TTI used for downlink-direction transmission in a TTI set.

In this embodiment of the present disclosure, priorities of all TTIs or some TTIs used for the downlink-direction transmission in the TTI set may be defined in advance. For example, a priority may be defined for each TTI included in the TTI set, and priorities of different TTIs are different. In this way, when determining to perform downlink transmission, the base station may determine the priority of each TTI used for the downlink-direction transmission in the TTI set.

Which TTIs are selected as the TTIs in the TTI set and how to set the priorities for the TTIs in the TTI set may be defined by a protocol or a standard in advance, or may be stipulated by an operator in advance. This is not limited in this embodiment of the present disclosure.

In addition, when there is no downlink service, the TTIs in the TTI set may all be scheduled as the uplink transmission, or may not be scheduled. In other words, a downlink priority of each TTI in the TTI set is not 100%; and each TTI is merely preferentially scheduled as downlink, and this does not mean that each TTI can be scheduled only as downlink.

S222: The base station selects, for a first cell, at least one TTI from the TTI set based on the priority.

When scheduling a TTI from the TTI set to perform downlink transmission, the base station may perform the scheduling based on a priority of the TTI, for example, perform the scheduling in descending order of priorities, or perform the scheduling in ascending order of priorities. In this way, base stations on the entire network or in the cell group all perform scheduling by using a same TTI set and based on a same scheduling rule, so that uplink and downlink TTIs on the entire network or in the cell group may be the same as far as possible, and contradirectional interference cases on the entire network or in the cell group can be reduced to a great extent. The scheduling rule herein may be understood as which TTI is scheduled as a downlink direction first and which TTI is scheduled as a downlink direction later. Certainly, setting the priority for each TTI and performing scheduling based on the priority is only a scheduling manner, and an objective is that network devices may all perform scheduling in the TTI set based on the same scheduling rule. Therefore, all manners enabling network devices to perform scheduling in the TTI set based on the same scheduling rule fall within the protection scope of this embodiment of the present disclosure.

FIG. 3C shows an example of a TTI set within a transmission period. An example in which the transmission period includes 10 TTIs is used. In this example, some TTIs of the 10 TTIs are assigned to a TTI set. The TTIs assigned to the TTI set are TTIs marked with digits in FIG. 3C. The mark digits indicate priorities of the TTIs. To be specific, a digit 1 indicates a first priority, a digit 2 indicates a second priority, a digit 3 indicates a third priority, and a digit 4 indicates a fourth priority. The first priority is the highest priority.

When scheduling a TTI from the TTI set in FIG. 3C to perform downlink transmission, the base station performs the scheduling, for example, in descending order of priorities of four TTIs included in the TTI set. For example, the base station determines, based on a downlink service load status, a quantity of downlink TTIs needed in a transmission period. If three TTIs are needed, the base station schedules TTIs marked with digits 1, 2, and 3 in FIG. 3C as downlink TTIs.

FIG. 3D shows an example of a TTI set within a transmission period. An example in which the transmission period includes 10 TTIs is used. In this example, all TTIs of the 10 TTIs are assigned to a TTI set. The TTIs assigned to the TTI set are TTIs marked with digits in FIG. 3D. The mark digits indicate priorities of the TTIs. To be specific, a digit 1 indicates a first priority, a digit 2 indicates a second priority, and the rest can be deduced by analogy. The first priority is the highest priority.

Similarly, when scheduling a TTI from the TTI set in FIG. 3D to perform downlink transmission, the base station also performs the scheduling, for example, in descending order of priorities of four TTIs included in the TTI set. For example, the base station determines, based on a downlink service load status, a quantity of downlink TTIs needed in a transmission period. If four TTIs are needed, the base station schedules TTIs marked with digits 1, 2, 3, and 4 in FIG. 3D as downlink TTIs.

It can be learned from the descriptions of FIG. 3C and FIG. 3D that, in this embodiment of the present disclosure, the TTI set may be for the transmission period, to be specific, there may be one TTI set for each transmission period. Therefore, TTI sets may be the same for different transmission periods, or TTI sets may be different for different transmission periods. This may be defined by a protocol or a standard in advance, or may be stipulated by an operator in advance. This is not limited in this embodiment of the present disclosure.

S223: Determine whether a transmission period of the first cell includes a contradirectional interference transmission time interval.

Downlink service load of each cell is different. Even if a same TTI set and a same scheduling rule are used, an uplink-downlink configuration of each cell may be different. The TTI set and the scheduling rule can reduce contradirectional interference as far as possible. However, because the downlink service load is different and each cell has a different quantity of downlink TTIs, the contradirectional interference may still exist. Therefore, in this embodiment of the present disclosure, at least two sets of power control parameters may still be configured by a base station, and the user equipment may calculate uplink transmit power by using the power control parameters. The at least two sets of power control parameters may include a first power control parameter and a second power control parameter. When the user equipment performs uplink transmission within the contradirectional interference TTI, the first power control parameter may be selected. The second power control parameter is a default power control parameter. Alternatively, when the user equipment performs uplink transmission at least within a non-contradirectional interference TTI, the second power control parameter may be selected. The base station may send the at least two sets of power control parameters to the user equipment. Therefore, when no contradirectional interference TTI exists, the user equipment may calculate the uplink transmit power based on the second power control parameter. When the contradirectional interference TTI exists, the user equipment may calculate the uplink transmit power based on the first power control parameter. The uplink transmit power calculated based on the first power control parameter is usually greater than the uplink transmit power calculated based on the first power control parameter. In other words, impact from contradirectional interference is reduced as far as possible by increasing the uplink transmit power.

As described above, the user equipment may select a power control parameter based on a status of the contradirectional interference. Then, how the user equipment learns of the status of the contradirectional interference TTI is also described. In this embodiment of the present disclosure, similarly, the base station may learn of the status of the contradirectional interference TTI. To be specific, the base station may determine whether the transmission period of the first cell includes the contradirectional interference TTI, and then sends indication information to the user equipment based on a result of determining whether the contradirectional interference TTI is included. The indication information is used to indicate a power control parameter used by the user equipment to perform uplink transmission. For a description of this part of content, refer to the related description in the previous embodiment. Details are not described again.

S224: The base station sends indication information to the user equipment based on a result of determining whether the contradirectional interference transmission time interval is included, where the indication information is used to indicate a power control parameter used by the user equipment to perform uplink transmission, and then the user equipment receives the indication information.

In this embodiment of the present disclosure, the base station sends the indication information to the user equipment by adding the indication information to DCI, and the DCI is used to indicate a downlink data transmission resource. For example, the base station sends DCI to the user equipment. The DCI may instruct to transmit downlink data, in the first cell, from the base station by using at least one TTI. The at least one TTI is scheduled by the base station from the TTI set. In addition, the indication information is carried in the DCI. For example, the indication information occupies one bit in the DCI. The user equipment may determine, based on the indication information, whether the transmission period of the first cell includes the contradirectional interference TTI, and determine a used power control parameter based on the indication information. For example, if a value of the bit is "0", it indicates that, in the transmission period of the first cell, other than the at least one TTI, another TTI scheduled as the uplink transmission is a TTI of a first type. In other words, the transmission period of the first cell does not include the contradirectional interference TTI. It may be understood as that the indication information in this case is the second indication information. Then, the user equipment may determine to calculate the uplink transmit power by using the second power control parameter, and an accumulated value of TTIs of the first type is used for $f_c(i)$. If a value of the bit is "1", it indicates that, in the transmission period of the first cell, other than the at least one TTI, another TTI scheduled as the uplink transmission is a TTI of a second type. In other words, the transmission period of the first cell includes the contradirectional interference TTI. It may be understood as that the indication information in this case is the first indication information. Then, the user equipment may determine to calculate the uplink transmit power by using the first power control parameter, and an accumulated value of TTIs of the second type is used for $f_c(i)$ Certainly, before selecting the power control parameter, the user equipment may first receive the at least two sets of power control parameters sent by the base station, including the first power control parameter and the second power control parameter.

S223 and S224 are optional steps. Therefore, in FIG. 2B, a box used to indicate S223 and an arrow used to indicate S224 are drawn in dashed lines, to distinguish from the mandatory steps. Certainly, if S224 is not performed, the base station may alternatively instruct, by using the DCI, the user equipment to perform uplink transmission.

S225: The user equipment performs, in the first cell, downlink-direction transmission from the base station by using at least one TTI indicated by received DCI.

After receiving the DCI, the user equipment determines the at least one TTI used to perform downlink transmission in the transmission period, and then may perform, in the first cell, transmission in the downlink direction from the base station based on the at least one TTI. In addition, when determining the at least one TTI used to perform downlink transmission in the transmission period, the user equipment may determine a TTI used to perform uplink transmission in the transmission period. In addition, if the DCI carries the indication information, the user equipment may determine, based on the indication information, to use which set of power control parameter to perform uplink transmission, and then calculate uplink transmit power based on the selected power control parameter. For a manner of calculating the uplink transmit power, refer to the description in the embodiment shown in FIG. 2A. Details are not described again.

The foregoing describes a case in which the base station schedules a TTI to perform downlink transmission. In this embodiment of the present disclosure, if the base station needs to schedule, in a transmission period, a TTI to perform uplink transmission, one manner is that the base station preferentially schedules a TTI that does not belong to the TTI set. If all TTIs that do not belong to the TTI set are used up, or all TTIs in a transmission period belong to the TTI set, the base station may alternatively schedule a TTI from the TTI set to perform uplink transmission. When the base station schedules the TTI from the TTI set to perform uplink transmission, the base station may perform the scheduling based on a scheduling rule reverse to that for scheduling the TTI for the downlink transmission. For example, if the base station performs the scheduling for the downlink transmission in descending order of priorities of TTIs in the TTI set, the base station may perform the scheduling for the uplink transmission in ascending order of the priorities of the TTIs in the TTI set. In this way, a conflict between uplink and downlink is avoided as far as possible, and occurrence of contradirectional interference cases is reduced as far as possible.

In this embodiment of the present disclosure, the TTI set, the priorities of the TTIs in the TTI set, and the scheduling rules are defined in advance in the FDD UL frequency band, so that the contradirectional interference between cells can be reduced as far as possible. The base station dynamically notifies, by using the DCI, a set of power control parameter used for an uplink TTI, so that an uplink receiving SINR can be increased.

The following describes a device provided according to an embodiment of the present disclosure with reference to the accompanying drawings.

Referring to FIG. 4, based on a same disclosure conception, an embodiment of the present disclosure provides a network device. The network device may include a processor 401.

The processor 401 may include a central processing unit (CPU) or an disclosure-specific integrated circuit (ASIC), may include one or more integrated circuits used to control program execution, may include a hardware circuit developed by using a field programmable gate array (FPGA), and may include a baseband chip.

In a possible implementation, the network device may further include a memory 402. They are all shown in FIG. 4. The memory 402 is not a mandatory device, and therefore is drawn in a form of a dashed-line box in FIG. 4, to distinguish from the mandatory devices. There may be one or more memories 402. The memory 402 may include a read-only memory (ROM), a random access memory (RAM), a magnetic disk memory, or the like. The memory 402 may be configured to store program code required by the processor 401 to perform a task, and may further be configured to store data.

In a possible implementation, the network device may further include a transmitter 403. They are all shown in FIG. 4. The transmitter 403 is not a mandatory device, and therefore is drawn in a form of a dashed-line box in FIG. 4, to distinguish from the mandatory devices. The transmitter 403 may belong to a radio frequency system, and is configured to perform network communication with an external device, for example, may communicate with an external device by using a network such as the Ethernet, a radio access network, or a wireless local area network.

The memory 402 and the transmitter 403 may be connected to the processor 401 by using a bus 400 (this is used as an example in FIG. 4), or may be connected to the processor 401 by using a special connection line.

Code corresponding to the methods shown in the foregoing is solidified into a chip by designing and programming the processor 401, so that when being run, the chip can perform the methods shown in the foregoing embodiments. How to design and program the processor 401 is a technology well known by persons skilled in the art, and details are not described herein.

The network device may be configured to perform the embodiments shown in FIG. 2 and configured to describe in detail the methods provided in the two embodiments subsequent to the embodiments shown in FIG. 2. For example, the network device is the network device described in the foregoing. Therefore, for functions or the like implemented by the units in the network device, refer to the descriptions in the foregoing method parts, and details are not described again.

Figure 5:
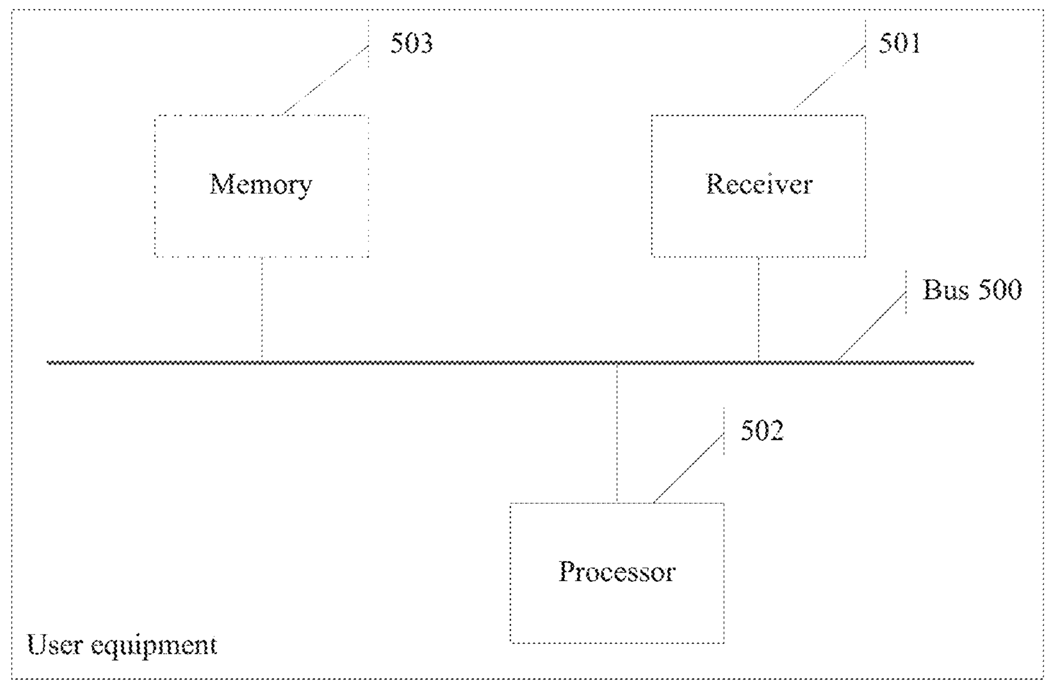
FIG. 5 is a schematic structural diagram of user equipment according to an embodiment of the present disclosure.

Referring to FIG. 5, based on a same disclosure conception, an embodiment of the present disclosure provides user equipment. The user equipment may include a receiver 501 and a processor 502.

The receiver 501 may belong to a radio frequency system, and is configured to perform network communication with an external device, for example, may communicate with an external device by using a network such as the Ethernet, a radio access network, or a wireless local area network.

The processor 502 may include a CPU or an ASIC, may include one or more integrated circuits used to control program execution, may include a hardware circuit developed by using an FPGA, and may include a baseband chip.

In a possible implementation, the user equipment may further include a memory 503. They are all shown in FIG. 5. The memory 503 is not a mandatory device, and therefore is drawn in a form of a dashed-line box in FIG. 5, to distinguish from the mandatory devices. There may be one or more memories 503. The memory 503 may include a ROM, a RAM, a magnetic disk memory, or the like. The memory 503 may be configured to store program code required by the processor 502 to perform a task, and may further be configured to store data.

The memory 503 and the receiver 501 may be connected to the processor 502 by using a bus 500 (this is used as an example in FIG. 5), or may be connected to the processor 502 by using a special connection line.

Code corresponding to the methods shown in the foregoing is solidified into a chip by designing and programming the processor 502, so that when being run, the chip can perform the methods shown in the foregoing embodiments. How to design and program the processor 502 is a technology well known by persons skilled in the art, and details are not described herein.

The user equipment may be configured to perform the embodiments shown in FIG. 2 and configured to describe in detail the methods provided in the two embodiments subsequent to the embodiments shown in FIG. 2. For example, the user equipment is the user equipment described in the foregoing. Therefore, for functions or the like implemented by the units in the user equipment, refer to the descriptions in the foregoing method parts, and details are not described again.

Figure 6:
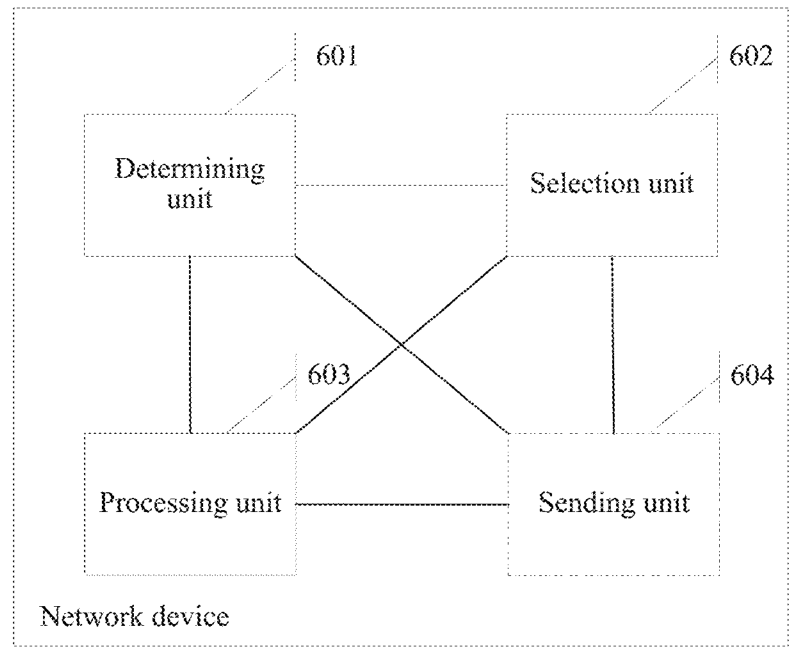
FIG. 6 is a schematic structural diagram of a network device according to an embodiment of the present disclosure.

Referring to FIG. 6, based on a same disclosure conception, an embodiment of the present disclosure provides a network device. The network device may include a determining unit 601, a selection unit 602, and a processing unit 603.

In a possible implementation, the network device may further include a sending unit 604. They are all shown in FIG. 6. The sending unit 604 is not a mandatory device, and therefore is drawn in a form of a dashed-line box in FIG. 6, to distinguish from the mandatory devices.

During actual disclosure, physical devices corresponding to the determining unit 601, the selection unit 602, and the processing unit 603 may be the processor 401 in FIG. 4, and a physical device corresponding to the sending unit 604 may be the transmitter 403 in FIG. 4.

The network device may be configured to perform the embodiment shown in FIG. 2 and configured to describe in detail the methods provided in the two embodiments subsequent to the embodiment shown in FIG. 2. For example, the network device is the network device described in the foregoing. Therefore, for functions or the like implemented by the units in the network device, refer to the descriptions in the foregoing method parts, and details are not described again.

Figure 7:
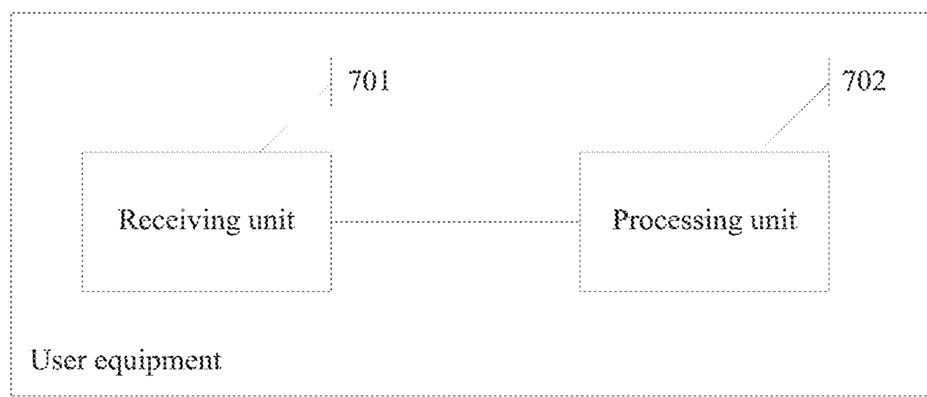
FIG. 7 is a schematic structural diagram of user equipment according to an embodiment of the present disclosure.

Referring to FIG. 7, based on a same disclosure conception, an embodiment of the present disclosure provides user equipment. The user equipment may include a receiving unit 701 and a processing unit 702.

During actual disclosure, a physical device corresponding to the receiving unit 701 may be the receiver 501 in FIG. 5, and a physical device corresponding to the processing unit 702 may be the processor 502 in FIG. 5.

The user equipment may be configured to perform the embodiments shown in FIG. 2 and configured to describe in detail the methods provided in the two embodiments subsequent to the embodiments shown in FIG. 2. For example, the user equipment is the user equipment described in the foregoing. Therefore, for functions or the like implemented by the units in the user equipment, refer to the descriptions in the foregoing method parts, and details are not described again.

In the embodiments of the present disclosure, a transmission time interval set may be preset, and when scheduling a transmission time interval, the network device may schedule, for user equipment, the transmission time interval from the transmission time interval set. If a plurality of network devices all preferentially schedule, for the user equipment, transmission time intervals from the transmission time interval set, different network devices have almost a same selection when selecting the transmission time intervals. Therefore, moments at which the different network devices perform uplink transmission may be the same, so that a possibility that the uplink transmission is interfered with by downlink transmission in another cell is reduced as far as possible, and transmission quality is improved.

In the present disclosure, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

An embodiment of the present disclosure further provides a computer storage medium. The computer storage medium may store a program. When being executed, the program includes some or all steps of any method for scheduling transmission that is set forth in the foregoing method embodiments.

Functional units in the embodiments of the present disclosure may be integrated into one processing unit, or each of the units may be an independent physical module.

When the integrated unit is implemented in the form of a software functional unit and sold or used as an independent product, the integrated unit may be stored in a computer-readable storage medium. Based on such an understanding, all of or a part of the technical solutions of the present disclosure may be implemented in a form of a software product. The computer software product is stored in a storage medium and includes several instructions for instructing a computer device, for example, which may be a personal computer, a server, or a network device or a processor to perform all or a part of the steps of the methods described in the embodiments of the present disclosure. The foregoing storage medium includes: any medium that can store program code, such as a universal serial bus flash drive, a removable hard disk, a ROM, a RAM, a magnetic disk, or an optical disc.

The foregoing embodiments are merely used to describe the technical solutions of the present disclosure. The foregoing embodiments are merely intended to help understand the method of the present disclosure, and shall not be construed as a limitation on the embodiments of the present disclosure. Any variation or replacement readily figured out by persons skilled in the art shall fall within the protection scope of the embodiments of the present disclosure.

What is claimed is:

1. A method for scheduling transmission in a wireless communications system, the method comprising:

determining, by a network device, a priority of each transmission time interval in a transmission time interval set, with each transmission time interval in the transmission time interval set configured for transmissions in a same first-direction, the transmission time interval set configured for a plurality of cells such that each of the plurality of cells uses one or more transmission time intervals in the transmission time interval set when performing a transmission in the first-direction, wherein the transmission in the first-direction is along a downlink direction from the network device to user equipment or along an uplink direction from the user equipment to the network device;

selecting, by the network device, for a first cell of the plurality of cells, at least one transmission time interval from the transmission time interval set based on the priority; and performing, by the network device, in the first cell, a first-direction transmission with the user equipment by using the selected at least one transmission time interval; and wherein the method further comprises:

determining, by the network device, whether a transmission period of the first cell comprises a contradirectional interference transmission time interval, wherein the contradirectional interference transmission time interval is a transmission time interval that is configured for uplink transmission in the first cell and configured for downlink transmission in a second cell; and sending, by the network device, indication information to the user equipment based on a result of determining whether the transmission period of the first cell comprises the contradirectional interference transmission time interval, the indication information for indicating a power control parameter to be used by the user equipment to perform uplink transmission in the contradirectional interference transmission time interval.

2. The method according to claim 1, wherein selecting, by the network device, the at least one transmission time interval from the transmission time interval set based on the priority comprises:

selecting, by the network device, the at least one transmission time interval from the transmission time interval set in descending order of priorities.

3. The method according to claim 1, wherein determining, by the network device, whether the transmission period of the first cell comprises the contradirectional interference transmission time interval comprises:

obtaining, by the network device, transmission time interval scheduling information of the second cell, and determining, based on the transmission time interval scheduling information, whether the transmission period of the first cell comprises the contradirectional interference transmission time interval; or receiving, by the network device, transmission time interval scheduling information of the second cell that is sent by another network device corresponding to the second cell, and determining, based on the transmission time interval scheduling information, whether the transmission period of the first cell comprises the contradirectional interference transmission time interval; or listening on, by the network device, the second cell in at least one transmission period, and determining, based on whether interference is greater than a preset threshold, whether the transmission period of the first cell comprises the contradirectional interference transmission time interval.

4. The method according to claim 3, wherein the transmission time interval scheduling information indicates:

a transmission direction of each transmission time interval in the second cell; or a transmission time interval that is in the second cell and is configured for uplink-direction transmission; or a transmission time interval that is in the second cell and is configured for a downlink-direction transmission; or a quantity of transmission time intervals that are in the second cell and are configured for uplink-direction transmission; or a quantity of transmission time intervals that are in the second cell and are configured for downlink-direction transmission.

5. The method according to claim 4, wherein:

the transmission time interval scheduling information further indicates:

the quantity of transmission time intervals that are in the second cell and are configured for uplink-direction transmission, or the quantity of transmission time intervals that are in the second cell and are configured for downlink-direction transmission; and determining, based on the transmission time interval scheduling information, whether the transmission period of the first cell comprises the contradirectional interference transmission time interval comprises:

determining, by the network device, based on the priority and the transmission time interval scheduling information, a transmission time interval that is in the transmission period and in the second cell and is configured for uplink-direction transmission or downlink-direction transmission, and determining, by the network device, based on the transmission time interval that is in the transmission period and in the second cell and is configured for uplink-direction transmission or downlink-direction transmission, whether the transmission period of the first cell comprises the contradirectional interference transmission time interval.

6. The method according to claim 1, wherein the indication information is carried in downlink control information for indicating an uplink data transmission resource.

7. The method according to claim 1, wherein:

sending, by the network device, the indication information to the user equipment based on the result of determining whether the transmission period of the first cell comprises the contradirectional interference transmission time interval comprises:

sending, by the network device, first indication information to the user equipment when determining that the transmission period of the first cell comprises the contradirectional interference transmission time interval, the first indication information for indicating a first power control parameter to be used by the user equipment to perform uplink transmission within the contradirectional interference transmission time interval; and the method further comprises:

sending, by the network device, second indication information to the user equipment for indicating a second power control parameter, and wherein the second power control parameter is a default power control parameter or a power control parameter for performing uplink transmission at least within a non-contradirectional interference transmission time interval, wherein the non-contradirectional interference transmission time interval is a transmission time interval other than the contradirectional interference transmission time interval.

8. A network device, comprising:

a processor; and a non-transitory computer-readable storage medium coupled to the processor and storing programming instructions that, when executed by the processor, cause the network device to:

determine a priority of each transmission time interval in a transmission time interval set, with each transmission time interval in the transmission time interval set configured for transmissions in a same first-direction, the transmission time interval set configured for a plurality of cells such that each of the plurality of cells uses one or more transmission time intervals in the transmission time interval set when performing a transmission in the first-direction, wherein the transmission in the first-direction is along a downlink direction from the network device to user equipment or along an uplink direction from the user equipment to the network device;

select, for a first cell of the plurality of cells, at least one transmission time interval from the transmission time interval set based on the priority; and perform, in the first cell, a first-direction transmission with the user equipment by using the selected at least one transmission time interval; and wherein the programming instructions, when executed by the processor, further cause the network device to:

determine whether a transmission period of the first cell comprises a contradirectional interference transmission time interval, wherein the contradirectional interference transmission time interval is a transmission time interval that is configured to uplink in the first cell and configured to downlink in a second cell; and send indication information to the user equipment based on a result of determining whether the transmission period of the first cell comprises the contradirectional interference transmission time interval, the indication information for indicating a power control parameter to be used by the user equipment to perform uplink transmission.

9. The network device according to claim 8, wherein to select, for the first cell, the at least one transmission time interval from the transmission time interval set based on the priority, the programming instructions, when executed by the processor, cause the network device to:

select the at least one transmission time interval from the transmission time interval set in descending order of priorities.

10. The network device according to claim 8, wherein to determine whether the transmission period of the first cell comprises the contradirectional interference transmission time interval, the programming instructions, when executed by the processor, cause the network device to:

obtain transmission time interval scheduling information of the second cell, and determine, based on the transmission time interval scheduling information, whether the transmission period of the first cell comprises the contradirectional interference transmission time interval; or receive, transmission time interval scheduling information of the second cell that is sent by another network device corresponding to the second cell, and determine, based on the transmission time interval scheduling information, whether the transmission period of the first cell comprises the contradirectional interference transmission time interval; or listen on the second cell in at least one transmission period, and determine, depending on whether interference is greater than a preset threshold, whether the transmission period of the first cell comprises the contradirectional interference transmission time interval.

11. The network device according to claim 10, wherein the transmission time interval scheduling information indicates:

a transmission direction of each transmission time interval in the second cell; or a transmission time interval that is in the second cell and is configured for uplink-direction transmission; or a transmission time interval that is in the second cell and is configured for downlink-direction transmission; or a quantity of transmission time intervals that are in the second cell and are configured for uplink-direction transmission; or a quantity of transmission time intervals that are in the second cell and are configured for downlink-direction transmission.

12. The network device according to claim 11, wherein:

the transmission time interval scheduling information further indicates:

the quantity of transmission time intervals that are in the second cell and are configured for uplink-direction transmission, or the quantity of transmission time intervals that are in the second cell and are configured for downlink-direction transmission; and the programming instructions, when executed by the processor, cause the network device to:

determine, based on the priority and the transmission time interval scheduling information, a transmission time interval that is in the transmission period and in the second cell and is configured for uplink-direction transmission and/or downlink-direction transmission, and determine, based on the transmission time interval that is in the transmission period and in the second cell and is configured for uplink-direction transmission or downlink-direction transmission, whether the transmission period of the first cell comprises the contradirectional interference transmission time interval.

13. The network device according to claim 8, wherein the indication information is carried in downlink control information for indicating an uplink data transmission resource.

14. The network device according to claim 8, wherein:

to send the indication information to the user equipment based on the result of determining whether the transmission period of the first cell comprises the contradirectional interference transmission time interval, the programming instructions, when executed by the processor, further cause the network device to:

send first indication information to the user equipment when determining that the transmission period of the first cell comprises the contradirectional interference transmission time interval, the first indication information for indicating a first power control parameter to be used by the user equipment to perform uplink transmission within the contradirectional interference transmission time interval; and the programming instructions, when executed by the processor, cause the network device to:

second indication information to the user equipment for indicating a second power control parameter, wherein the second power control parameter is a default power control parameter, or a power control parameter used to perform uplink transmission at least within a non-contradirectional interference transmission time interval, and wherein the non-contradirectional interference transmission time interval is a transmission time interval other than the contradirectional interference transmission time interval.

15. User equipment, comprising:

a processor; and a non-transitory computer-readable storage medium coupled to the processor and storing programming instructions that, when executed by the processor, cause the user equipment to:

receive downlink control information sent by a network device that indicates an uplink data transmission resource; and perform, in a first cell of a plurality of cells, a first transmission in a first-direction with the network device by using at least one transmission time interval indicated by the downlink control information, wherein the at least one transmission time interval was selected for the first cell by the network device from a transmission time interval set based on a priority of each transmission time interval in the transmission time interval set, each transmission time interval in the transmission time interval set configured for transmissions in the same first-direction, and the transmission time interval set configured for the plurality of cells such that each of the plurality of cells uses one or more transmission time intervals in the transmission time interval set when performing a transmission in the first-direction, and wherein the transmission in the first-direction is along a downlink direction from the network device to the user equipment or along an uplink direction from the user equipment to the network device; and wherein the programming instructions, when executed by the processor, cause the user equipment further to:

obtain indication information carried in the downlink control information, the indication information indicating a power control parameter to be used by the user equipment to perform uplink transmission in a contradirectional interference transmission time interval, and the indication information related to whether a transmission period of the first cell comprises the contradirectional interference transmission time interval, wherein the contradirectional interference transmission time interval is a transmission time interval that is configured for uplink transmission in the first cell and configured for downlink transmission in a second cell.

16. The user equipment according to claim 15, wherein the programming instructions that, when executed by the processor, cause the user equipment to:

determine, based on the indication information, the power control parameter used to perform uplink transmission.

17. The user equipment according to claim 15, wherein to obtain the indication information carried in the downlink control information, the programming instructions, when executed by the processor, cause the user equipment to:

obtain first indication information carried in the downlink control information, wherein the first indication information indicates a first power control parameter to be used by the user equipment to perform uplink transmission within the contradirectional interference transmission time interval; or obtain second indication information carried in the downlink control information, wherein the second indication information indicates a second power control parameter, and wherein the second power control parameter is a default power control parameter, or a power control parameter used to perform uplink transmission at least within a non-contradirectional interference transmission time interval, wherein the non-contradirectional interference transmission time interval is a transmission time interval other than the contradirectional interference transmission time interval.

18. The user equipment according to claim 17, wherein the programming instructions, when executed by the processor, cause the user equipment to:

receive at least two sets of power control parameters sent by the network device, wherein the at least two sets of power control parameters are used to calculate uplink transmit power, and wherein the at least two sets of power control parameters comprise the first power control parameter and the second power control parameter.

* * * * *